US008711836B2

(12) United States Patent
Cooke et al.

(10) Patent No.: US 8,711,836 B2
(45) Date of Patent: Apr. 29, 2014

(54) SYNCHRONIZATION OF COMMUNICATION EQUIPMENT

(75) Inventors: Stephen P. Cooke, Rocky View (CA); Tino Zottola, Beaconsfield (CA)

(73) Assignee: Genesis Technical Systems Corp., Calgary (CA)

( * ) Notice: Subject to any disclaimer, the term of this patent is extended or adjusted under 35 U.S.C. 154(b) by 383 days.

(21) Appl. No.: 13/003,680

(22) PCT Filed: Jul. 13, 2009

(86) PCT No.: PCT/CA2009/000972
§ 371 (c)(1),
(2), (4) Date: Jan. 11, 2011

(87) PCT Pub. No.: WO2010/003251
PCT Pub. Date: Jan. 14, 2010

(65) Prior Publication Data
US 2011/0110359 A1  May 12, 2011

Related U.S. Application Data

(60) Provisional application No. 61/079,967, filed on Jul. 11, 2008.

(51) Int. Cl.
*H04J 3/06* (2006.01)
(52) U.S. Cl.
USPC ........... 370/350; 370/310; 370/315; 370/258; 370/465; 370/470; 370/503; 370/510; 370/512; 370/513; 370/514; 455/12.1; 455/13.1; 455/13.2
(58) Field of Classification Search
None
See application file for complete search history.

(56) References Cited

U.S. PATENT DOCUMENTS

| 5,517,685 | A  | * | 5/1996  | Aoyama et al. ............... 455/260 |
|-----------|----|---|---------|--------------------------------------|
| 5,886,992 | A  |   | 3/1999  | Raatikainen et al.                   |
| 6,466,342 | B1 | * | 10/2002 | Frigo et al. ....................... 398/82 |
| 6,501,743 | B1 | * | 12/2002 | Kim et al. ...................... 370/324 |
| 6,611,537 | B1 | * | 8/2003  | Edens et al. .................. 370/503 |
| 6,751,248 | B1 |   | 6/2004  | Tan                                  |
| 7,321,729 | B2 |   | 1/2008  | Gumaste et al.                       |
| 2006/0114943 | A1 | * | 6/2006 | Kynast et al. ................. 370/509 |

(Continued)

FOREIGN PATENT DOCUMENTS

JP        2000315986 A     11/2000
WO   WO 2009/149533 A1   12/2009

*Primary Examiner* — Ian N Moore
*Assistant Examiner* — Eric H Wang
(74) *Attorney, Agent, or Firm* — Wolf, Greenfield & Sacks, P.C.

(57) ABSTRACT

Apparatus and methods relating to synchronization of communication equipment are disclosed. Synchronization information received from a bonded communication link can be used to synchronize local and/or remote communication equipment, such as femtocell sites coupled to nodes in a ring network. This may involve isolating a frequency reference signal from a DSL (Digital Subscriber Line) communication link which is a constituent link of a bonded communication link, for example. In a ring network, received synchronization information could be used in synchronizing a locally connected installation of communication equipment, and passed for transmission in the ring network for synchronizing other communication equipment. Such dropping and passing of an analog frequency reference signal could be applied in networks having other topologies as well. At least some embodiments of the invention are applicable to optical links. One or more dedicated wavelengths of an optical link could be used to transfer a frequency reference signal, for example. Other functions, such as quality monitoring, quality reporting, and/or predictive traffic forwarding may be provided in some embodiments.

32 Claims, 15 Drawing Sheets

(56) References Cited

U.S. PATENT DOCUMENTS

| | | | |
|---|---|---|---|
| 2006/0156215 A1 * | 7/2006 | Kapur et al. | 714/818 |
| 2007/0030856 A1 | 2/2007 | Cooke et al. | |
| 2009/0092242 A1 | 4/2009 | Cooke et al. | |
| 2009/0103490 A1 * | 4/2009 | Lakshmikanthan et al. | 370/331 |

* cited by examiner

SYNCHRONIZATION OF COMMUNICATION EQUIPMENT

CROSS-REFERENCE TO RELATED APPLICATION

This application claims the benefit of U.S. Patent Application Ser. No. 61/079,967, entitled "SYNCHRONIZATION OF COMMUNICATION EQUIPMENT", and filed on Jul. 11, 2008. This application is also a National Phase application of, and claims the benefit of, International (PCT) Application Serial No. PCT/CA2009/000972, filed on Jul. 13, 2009. The entire contents of these applications are incorporated herein by reference.

FIELD OF THE INVENTION

This invention relates generally to communications and, in particular, to synchronization of communication equipment.

BACKGROUND

DSL (Digital Subscriber Line) Rings, such as disclosed in U.S. patent application Ser. No. 11/463,240, filed on Aug. 8, 2006, in U.S. Provisional Patent Application Ser. No. 60/706,022, filed on Aug. 8, 2005, and in International (PCT) Application Serial No. PCT/CA2008/001079, entitled "BONDED INTERCONNECTION OF LOCAL NETWORKS" and filed on Jun. 9, 2008, the entire contents of all of which are incorporated herein by reference, represent new and powerful reconfigurations of existing telecommunication network resources.

Such rings enable higher bandwidths to be achieved at greater distances from a CO (Central Office). As those skilled in the art will appreciate, the transmission bandwidth of technologies such as DSL and Ethernet decreases with distance. In a star network architecture for instance, a DSLAM (DSL Access Multiplexer) is physically located in the middle, but the distance to each subscriber is often greater than the relatively short distance required for maximum bandwidth. DSL Rings greatly increase the distance and bandwidth-carrying capability of the 'local loop'. High bandwidth is made available to households by reducing the transmission distance to the distance between households instead of the distance between households and COs. Maximum bandwidth can be obtained if the distance between households that are connected together is less than the maximum bandwidth distance.

The high bandwidth capability provided by DSL Rings could be used, for example, to provide network backhaul for bandwidth-intensive end user applications. Wireless network operators and service providers, for instance, are continually striving to provide higher bandwidth to their subscribers. Services such as wireless streaming video could potentially be supported if wireless bandwidth of 100 Mbps were available.

Such high bandwidths cannot be provided in current wireless communication networks that are based on "macrocell" designs. For example, a typical wireless site is serviced by four T1 lines, which can support 112 simultaneous cell phone calls and limited Internet capability. The cost of upgrading the macrocell approach is prohibitive and will not support the necessary coverage with the necessary bandwidth. Alternate network implementations based on other technologies are therefore being explored. Femtocells are representative of one such technology.

A femtocell is a small cellular base station used in residential or small business applications, which connects to a service provider's network and normally supports less than 10 mobile devices. Femtocells allow service providers to effectively extend service coverage indoors or over a relatively short range, where access might otherwise be limited or unavailable. While a femtocell itself might support bandwidths on the order of 100 Mbps, the challenge of providing the 200-300 Mbps bandwidth necessary for backhaul to a main network still remains.

This is one scenario in which the high bandwidth capability of DSL Rings having bonded links back to a main network can be particularly useful. However, proper operation of a femtocell, which might be implemented at each node in a ring for example, requires accurate synchronization (e.g., 50 parts per billion—ppb—or better) with the service provider's network. A femtocell station lacking accurate synchronization will exhibit undesirable behaviour such as call dropping or the inability to establish calls reliably. Traditionally local synchronization was accomplished either with a GPS (Global Positioning System) unit at each node or with a dedicated BITS (Building Integrated Timing Supply) synchronization line to each node, as is the case with SONET/SDH (Synchronous Optical NETwork/Synchronous Digital Hierarchy) optical systems. Where many individual femtocells are deployed, as might be the case in a DSL Rings implementation, the use of a dedicated GPS unit or a local synchronization line for each femtocell becomes cost prohibitive.

Another possible option would be a wireless-based synchronization signal. This approach, however, would take traffic-carrying bandwidth out of the highest revenue part of a communication system. An NTP (Network Timing Protocol) packet-based approach, while possibly being cost effective, might not be sufficiently accurate. Precision Timing Protocol (IEEE 1588) would be accurate and cost effective, but suffers quality degradation as the distance from the timing source increases.

At least some of these issues could also affect synchronization of other communication equipment, such as a traffic processor and/or other elements of a ring node itself, for instance.

SUMMARY OF THE INVENTION

According to an aspect of the invention, there is provided an apparatus including: a synchronization information receiver to receive network synchronization information from a network communication link that enables communications with a communication network, the received network synchronization information for synchronizing communication equipment with the communication network; and a synchronization information distributor to provide, based on the received network synchronization information, local synchronization information for synchronizing the communication equipment with the communication network.

In some embodiments, the synchronization information distributor is further operable to provide, based on the received network synchronization information, remote synchronization information for transmission to further communication equipment, the remote synchronization information for synchronizing the further communication equipment with the communication network.

The communication equipment and the remote communication equipment might be respective installations of wireless communication equipment that provide a wireless communication service within respective service areas in some embodiments. The installations of wireless communication equipment might be associated with one or more wireless service providers.

Where the received network synchronization information includes a synchronization packet having a first priority, the synchronization information distributor might be operable to provide the remote synchronization information by changing the priority of the synchronization packet to a second priority.

In the case where the received network synchronization information includes a synchronization packet, the synchronization information distributor might be operable to provide the synchronization packet as the local synchronization information, and the synchronization information distributor could include a synchronization information generator to generate as the remote synchronization information a frequency reference standard based on the received synchronization packet.

The received network synchronization information might include a frequency reference signal, and in this instance the synchronization information distributor could be operable to provide the frequency reference signal as the local synchronization information, and the synchronization information distributor might include a synchronization information generator to generate as the remote synchronization information a synchronization packet based on the received frequency reference signal.

The apparatus might also include a quality monitor to monitor a quality measure of the received network synchronization information. The quality monitor could be further operable to report a monitoring result via the network communication link.

A quality monitor could monitor a quality measure of received network synchronization information, and to perform at least one of: receiving quality monitoring information associated with the remote synchronization information and reporting a monitoring result to the further communication equipment. In this case, the quality monitor could be further operable to detect a quality problem with the remote synchronization information based on the received quality monitoring information, and to perform, responsive to detecting the quality problem, at least one of: causing a characteristic of the remote synchronization information to be adjusted and reporting the quality problem via the network communication link.

Where the received network synchronization information includes multiple sets of redundant synchronization information, one of the multiple sets of redundant synchronization information could be selected for use as basis for the local synchronization information responsive to a result of monitoring by the quality monitor.

In some embodiments, the synchronization information distributor is operable to provide the remote synchronization information for transmission to the further communication equipment through at least one of: a ring communication network, a bonded communication link, an optical communication link, and a wireless communication link.

The synchronization information distributor could be further operable to transmit the remote synchronization information using one or more of: RPR (Resilient Packet Ring), Ethernet, and VDSL2 (Very high bit rate Digital Subscriber Line version 2).

The network communication link includes a bonded DSL (Digital Subscriber Line) link in some embodiments.

The synchronization information distributor could be operable to provide the local synchronization information and the remote synchronization information based on the received network synchronization information where no new network synchronization information is received during a holdover time period.

Where the network communication link includes a bonded communication link, the synchronization information receiver might isolate a frequency reference signal from a DSL (Digital Subscriber Line) communication link which is a constituent link of the bonded communication link. In this case, the received frequency reference signal includes the network synchronization information.

A quality monitor could be provided to monitor a quality measure of the received network synchronization information, and to use the frequency reference signal as a messaging channel to report a monitoring result.

In some embodiments, the synchronization information receiver is further operable to isolate respective frequency reference signals from multiple DSL communication links of the bonded communication link, and one of the redundant frequency reference signals is selected for use as basis for the local synchronization information responsive to a result of monitoring by the quality monitor.

The quality measure might be respective error rates of the redundant frequency reference signals, in which case the redundant frequency reference signal having a lowest error rate is selected for use as basis for the local synchronization information. The synchronization information distributor might be operable to determine the respective error rates based on a PRBS (Pseudo-Random Bit Sequence) that is combined with the redundant frequency reference signals.

The received frequency reference signal could be DSL traffic being transferred on the DSL communication link, with the local synchronization information being a clock signal recovered from the DSL traffic.

In some embodiments, the network synchronization information is network synchronization information being transferred in a ring communication network that is operatively coupled to the communication network, the received network synchronization information for synchronizing, with the communication network, installations of communication equipment that are operatively coupled to the ring communication network. The communication equipment might include one of the installations of communication equipment operatively coupled to the ring communication network, and the synchronization information distributor could be further operable to provide the received synchronization information for transmission in the ring communication network for synchronizing others of the installations of communication equipment.

Where a quality monitor is provided to monitor a quality measure of the received network synchronization information and the received network synchronization information includes multiple sets of redundant synchronization information, one of the multiple sets of redundant synchronization information could be selected for use as basis for the local synchronization information responsive to a monitoring result. The multiple sets of redundant synchronization information include network synchronization information being transferred in opposite directions in the ring communication network in some embodiments.

The synchronization information receiver might receive an analog frequency reference signal as the network synchronization information. In this case, the synchronization information distributor could be further operable to pass the analog frequency reference signal for transmission to further communication equipment for synchronizing the further communication equipment with the communication network.

In some embodiments, the network communication link is an optical communication link, and the synchronization information receiver receives, as the network synchronization information, a frequency reference signal on a dedicated wavelength of the optical communication link.

A quality monitor might be provided to monitor a quality measure of the received network synchronization information, and to report a monitoring result via the dedicated wavelength. The quality monitor could be operable to use the frequency reference signal as a messaging channel to report the monitoring result.

The optical communication link is an optical collector ring in some embodiments.

Such an apparatus could be implemented, for example, in conjunction with a ring network in which at least one of traffic channels and bandwidths are asymmetric.

A communication system might include: a gateway node operatively coupled to a main communication network through a bonded or optical communication link; at least one subscriber node, operatively coupled to the gateway node, to provide a communication service to subscriber premises; and at least one installation of communication equipment, respectively operatively coupled to a subscriber node of the at least one subscriber node. Any or all of the gateway node and at least one subscriber node could include such an apparatus.

The communication system could also include: at least one further gateway node operatively coupled to the gateway node through a respective bonded or optical communication link; a respective set of at least one further subscriber node, respectively operatively coupled to the at least one gateway node, to provide a communication service to further subscriber premises; and at least one further installation of communication equipment, respectively operatively coupled to a subscriber node of the at least one further subscriber node. Any or all of the at least one further gateway node and the at least one further subscriber node might include such an apparatus.

A method is also provided, and involves: receiving network synchronization information from a network communication link that enables communications with a communication network, the received network synchronization information for synchronizing communication equipment with the communication network; and providing, based on the received network synchronization information, local synchronization information for synchronizing the communication equipment with the communication network.

The method might also include providing, based on the received network synchronization information, remote synchronization information for transmission to further communication equipment, the remote synchronization information for synchronizing the further communication equipment with the communication network.

In some embodiments, the received network synchronization information includes a synchronization packet having a first priority, and providing the remote synchronization information involves generating the remote synchronization information by changing the priority of the synchronization packet to a second priority.

Where the received network synchronization information includes a synchronization packet, providing the local synchronization information might involve providing the synchronization packet as the local synchronization information, and wherein providing the remote synchronization information comprises generating as the remote synchronization information a frequency reference standard based on the received synchronization packet.

The received network synchronization information might include a frequency reference signal, in which case providing the local synchronization might involve providing the frequency reference signal as the local synchronization information and providing the remote synchronization information might involve generating as the remote synchronization information a synchronization packet based on the received frequency reference signal.

The method could also include monitoring a quality measure of the received network synchronization information, and reporting a monitoring result via the network communication link.

In some embodiments, the method includes monitoring a quality measure of the received network synchronization information, and at least one of: receiving quality monitoring information associated with the remote synchronization information and reporting a monitoring result to the further communication equipment.

The method might also include detecting a quality problem with the remote synchronization information based on the received quality monitoring information, and performing, responsive to detecting the quality problem, at least one of: causing a characteristic of the remote synchronization information to be adjusted and reporting the quality problem via the network communication link.

Where the received network synchronization information includes multiple sets of redundant synchronization information, the method could involve monitoring a quality measure of the sets of redundant synchronization information; and selecting one of the multiple sets of redundant synchronization information for use as basis for the local synchronization information responsive to a result of the monitoring.

The remote synchronization information could be transmitted through at least one of: a ring communication network, a bonded communication link, an optical communication link, and a wireless communication link.

In some embodiments, the method involves transmitting the remote synchronization information using one or more of: RPR (Resilient Packet Ring), Ethernet, and VDSL2 (Very high bit rate Digital Subscriber Line version 2).

The network communication link could be a bonded DSL (Digital Subscriber Line) link.

Providing the local synchronization information and providing the remote synchronization information might involve providing the local synchronization information and providing the remote synchronization information based on the received network synchronization information where no new network synchronization information is received during a holdover time period.

Where the network communication link is a bonded communication link, receiving might involve isolating a frequency reference signal from a DSL (Digital Subscriber Line) communication link which is a constituent link of the bonded communication link. In this case, the received frequency reference signal is the network synchronization information.

The method might also include monitoring a quality measure of the received network synchronization information, and using the frequency reference signal as a messaging channel to report a monitoring result.

Isolating might involve isolating respective frequency reference signals from multiple DSL communication links of the bonded communication link. In this case, the method could also include monitoring a quality measure of the respective frequency reference signals, and selecting one of the redundant frequency reference signals for use as basis for the local synchronization information responsive to a result of the monitoring.

In some embodiments, the quality measure includes respective error rates of the redundant frequency reference signals, and selecting comprises selecting the redundant frequency reference signal having a lowest error rate. The method might then include determining the respective error rates based on a PRBS (Pseudo-Random Bit Sequence) that is combined with the redundant frequency reference signals.

The received frequency reference signal is DSL traffic being transferred on the DSL communication link in some embodiments, in which case the local synchronization information could be a clock signal recovered from the DSL traffic.

The network synchronization information could be network synchronization information, being transferred in a ring communication network that is operatively coupled to the communication network, for synchronizing with the communication network installations of communication equipment that are operatively coupled to the ring communication network. The communication equipment could then be one of the installations of communication equipment operatively coupled to the ring communication network, and the method could further include providing the received synchronization information for transmission in the ring communication network for synchronizing others of the installations of communication equipment.

Where the received network synchronization information includes multiple sets of redundant synchronization information, the method might also include monitoring a quality measure of the received network synchronization information, and selecting one of the multiple sets of redundant synchronization information for use as basis for the local synchronization information responsive to a result of the monitoring. The multiple sets of redundant synchronization information could include network synchronization information being transferred in opposite directions in the ring communication network.

In some embodiments, receiving involves receiving an analog frequency reference signal as the network synchronization information, and the method also includes passing the analog frequency reference signal for transmission to further communication equipment for synchronizing the further communication equipment with the communication network.

Where the network communication link is an optical communication link, receiving might involve receiving as the network synchronization information a frequency reference signal on a dedicated wavelength of the optical communication link.

The method might also include monitoring a quality measure of the received network synchronization information, and reporting a result of the monitoring via the dedicated wavelength.

Reporting could involve using the frequency reference signal as a messaging channel to report the monitoring result.

Receiving might include receiving respective frequency reference signals from multiple dedicated wavelengths of the optical communication link, in which case the method might also involve monitoring a quality measure of the received network synchronization information, and selecting one of the redundant frequency reference signals for use as basis for the local synchronization information responsive to a result of the monitoring.

The optical communication link is an optical collector ring in some embodiments.

Another aspect of the invention provides an apparatus including: a communication interface to enable communications in a ring communication network; and a traffic processor operatively coupled to the communication interface to process communication traffic being transferred in the ring communication network, the communication traffic including communication traffic destined for wireless communication devices to which a wireless communication service is provided within respective service areas by respective synchronized installations of wireless communication equipment that are operatively coupled to the ring communication network, the traffic processor being operable to detect movement of a wireless communication device from a service area of one of the synchronized installations of wireless communication equipment to a service area of another one of the synchronized installations of wireless communication equipment, and to provide a predictive traffic forwarding function for communication traffic destined for the wireless communication device based on the detected movement.

In some embodiments, the traffic processor is operable to detect movement of the wireless communication device based on communication traffic that originates with the wireless communication device and is transferred in the ring communication network.

The predictive traffic forwarding function might control one or more of: a network element of the ring communication network to which the communication traffic destined for the wireless communication device is forwarded and a direction in which the communication traffic destined for the wireless communication device is forwarded in the ring communication network.

Such an apparatus could be implemented at each of multiple ring nodes in the ring communication network, for example.

Where the ring network includes ring nodes, with at least one of the ring nodes being operatively coupled to a bonded communication link to a main communication network, the apparatus might be implemented at each of the at least one of the ring nodes that is operatively coupled to the bonded communication link.

The apparatus could also be implemented at each of the ring nodes.

A method includes: detecting movement of a wireless communication device, to which a wireless communication service is provided within respective service areas by respective synchronized installations of wireless communication equipment that are operatively coupled to a ring communication network, from a service area of one of the synchronized installations of wireless communication equipment to a service area of another one of the synchronized installations of wireless communication equipment; and providing a predictive traffic forwarding function for communication traffic destined for the wireless communication device based on the detected movement.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Embodiments of the present invention may be applied, for example, in conjunction with DSL Rings as disclosed in the above-referenced patent applications. Therefore, a brief description of DSL Rings is provided below.

Star Topology

Those familiar with DSL communications will appreciate that in one known network topology for connecting copper pairs between households and a CO, many households or customer sites are interconnected with a single CO using twisted pair cables in a star network topology. The interconnections are generally referred to as the "last mile". Such interconnections could also or instead include connections via optical fibre and/or wireless links.

The transmission bandwidth of technologies such as DSL and Ethernet decreases with distance. In a star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible.

Ring Topology

Figure 1:
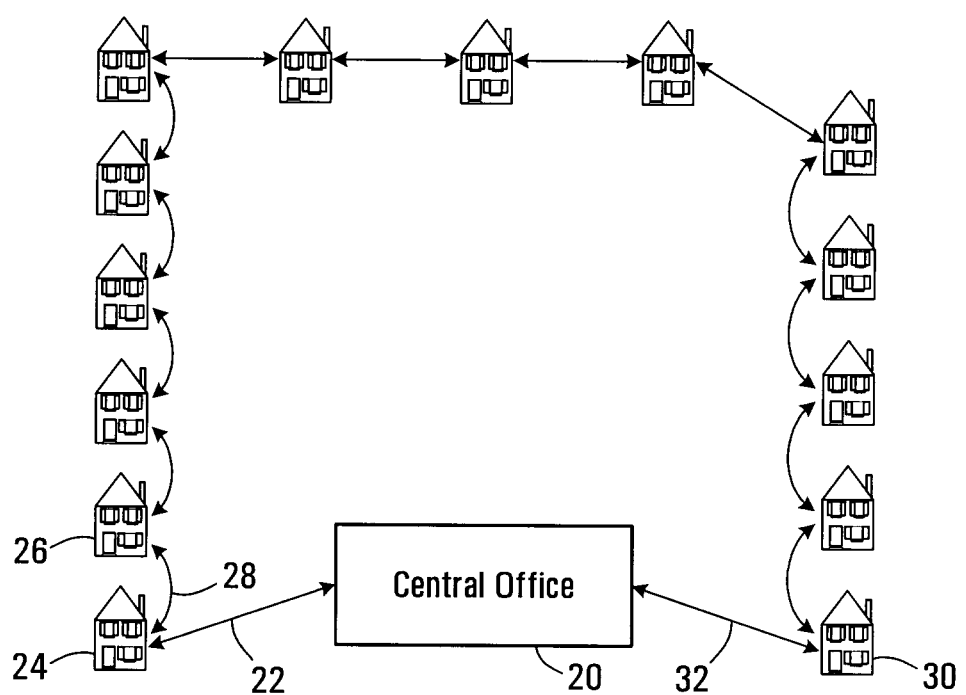
FIG. 1 is a block diagram of an example ring network topology for connecting copper pairs between households and a CO.

Referring now to FIG. 1, shown is an example ring network topology for connecting copper pairs between households and a CO. While throughout this description copper pairs are referred to, more generally any electrically conducting twisted wire pairs and possibly other types of connections can be employed. Many households 24, 26, . . . , 30 and a single CO 20 are interconnected using twisted pair cables in a ring network topology. More specifically, the CO 20 is connected to a first household 24 with twisted pair cables 22; the first household 24 is connected to second household 26 with twisted pair cable 28 and so on to the last household 30, which is connected to the CO 20 with twisted pair cables 32. Each household has a customer communications node that provides packet add/drop functionality. In a particular example, the customer communications node is an HCC (Home Communications Centre), which enables DSL ring topologies in telecom service provider networks. Example HCCs are described in detail below with reference to FIG. 2. A 'Ring' is a special case of the more general 'Daisy Chain of Add/Drop Multiplexers (ADMs)' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local loop'. High bandwidth is made available to the households by reducing the transmission distance to that between households instead of between households and gateway nodes or Central Offices. Maximum bandwidth is obtained if the distance between houses connected together is less than the maximum bandwidth distance.

In some implementations, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables. In some cases it may be possible to achieve the ring topology by simply "jumpering" twisted pairs together inside these access points so that no actual "cutting of wires" is necessary.

In some implementations, once the new topology is available, a complete package of services with a documented feature evolution is implemented. The complete package may for example include combinations of features such as Internet Home Theatre or IPTV (Internet Protocol TeleVision), AMR (Automatic Meter Reading), Home Security Monitoring, Virtual Private Networking, Internet Security and Connection Maintenance (i.e., platform updates performed without customer intervention), and Medical Aid Monitoring.

HCC (Home Communications Centre)

Figure 2:
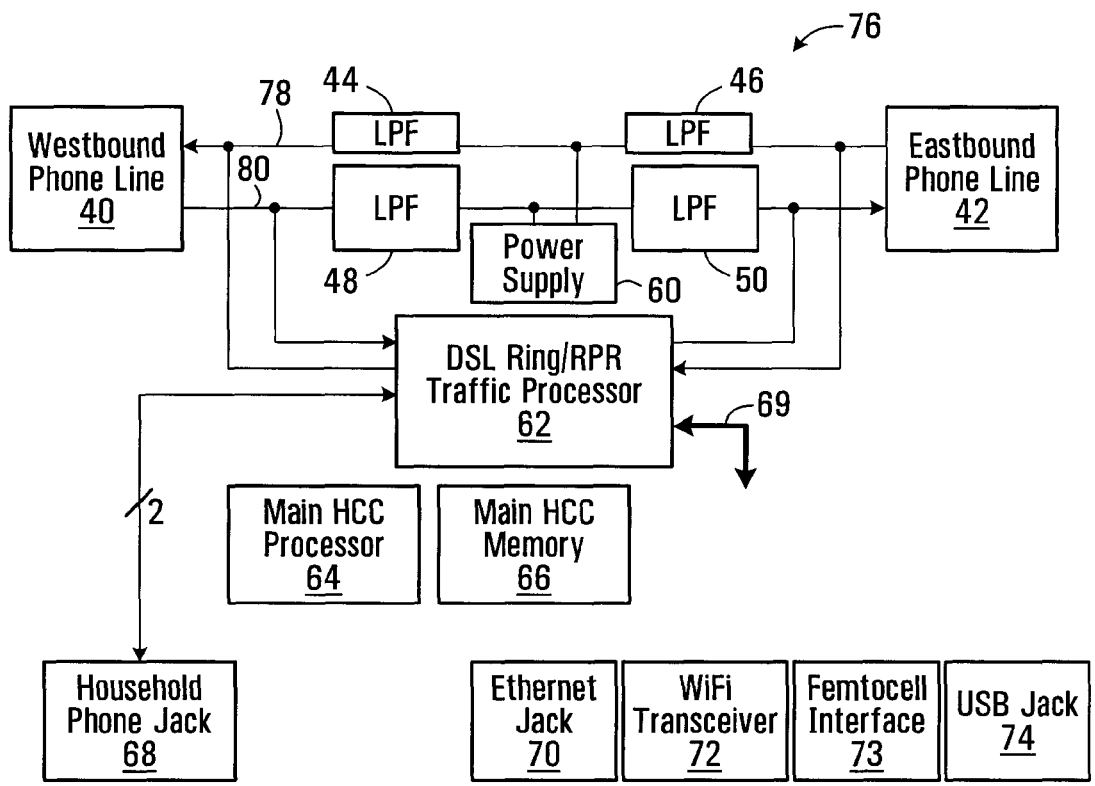
FIG. 2 is a block diagram of an example HCC (Home Communications Centre).

Referring now to FIG. 2, shown is a block diagram of an example HCC (Home Communications Centre) generally indicated at 76. It is to be understood that the HCC 76 shown in FIG. 2 is very specific for example purposes only. In general, equipment in conjunction with which an HCC may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a copper pair of wires. The HCC has a DSL Ring/RPR (Resilient Packet Ring) traffic processor 62 coupled to the westbound phone line 40 and the eastbound phone line 42. The HCC also has a main HCC processor 64 and a main HCC memory 66. A power supply 60 is coupled to the westbound phone line 40 and the eastbound phone line 42 via respective LPFs (low pass filters) 44, 46, 48, 50. A household phone jack 68 is coupled to the DSL Ring/

RPR traffic processor 62. Other possible interfaces include an Ethernet jack 70, a WIFI transceiver 72, a femtocell interface 73, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some implementations, protection switching of traffic is handled by an industry-standard protocol designed specifically for this task. An example of this would be RPR (IEEE 802.17) technology. RPR was developed for the optical transport infrastructure, but might also be adapted to fit well into this application.

There are two twisted copper pairs: the westbound phone line 40, and the eastbound phone line 42 (i.e., in opposite directions). In some implementations, communication over a phone line is bi-directional. In some implementations, the data rate is symmetrical (i.e., transmit bit rate=receive bit rate) for both eastbound and westbound directions. In some implementations, flow control mechanisms are used so that the data rate is the same around the ring and so that there are no links that are faster than others. A given household may communicate with the CO by an eastbound path and/or a westbound path. Communications with households may also be through a wireless mesh overlay via the WiFi and/or femtocell interfaces 72, 73, to provide for wireless backhaul for instance. In some implementations, if communication on a ring via one direction is not possible, then communication via the other direction is attempted.

Since a number of households are occupying a single ring, there is generally no baseband channel available for each household for analogue communication although it would be technically feasible to provide a single baseband channel in each direction, for example to a first household in each direction. As such (in the most likely scenario), conventional POTS (Plain Ordinary Telephone Service) communications such as telephone and FAX are also digitized and sent on the ring. Thus, communication over the eastbound phone line 42 and the westbound phone line 40 might be digital only, for example using DSL communication. Accordingly in some implementations, if analog devices, such as analog telephones and fax machines, are to be interfaced with the HCC 76, then the HCC provides D/A (digital to analog) and A/D (analog to digital) conversions, though this is not necessary to support analog communications. Such conversions are not necessary for interfacing the HCC 76 with digital communication devices. Also, in such implementations, the CO ensures that communication transmitted to an HCC 76 is digital. Digital communication comprises data packet communication in one implementation. DSL communication is one example of digital communication.

Another possible option would be to provide support for baseband POTS and implement each ring in the form of a DSL frequency overlay.

The household phone jack 68, the Ethernet jack 70, the WiFi transceiver 72, and the femtocell interface 73 provide communication interfaces for the household. The USB jack 74 may, in addition to providing a further communication interface, enable memory expansion and maintenance access for the HCC 76 when it is installed. The HCC 76 may be installed in a residence or business premises and remains with the residence/business premises permanently. This can be used to enable AMR (automatic meter reading) functionality, for instance. In some implementations, the architecture combines existing home phones with mobile phones. This may for example include most recent and/or backward compatible wireless interfaces. In some implementations, the HCC 76 has one or more wireless interface(s), for example the WiFi (IEEE 802.11a/b/g/n) interface 72 and femtocell interface 73 to enable communication with wireless devices, such as wireless appliances, stereos, PCs, TVs, meters, mobile phones, Set Top Boxes (STBs), etc.

In some implementations, QoS (Quality of Service) is provided so as to provide certain communications with greater priority than other communications. A list of example communications with decreasing priorities may be VoIP (Voice over Internet Protocol) communication, streaming video communication, Internet Gaming, Business Services and non-streaming data communication. Having a greater priority provides streaming communication with a greater likelihood of being uninterrupted and having less latency and/or jitter. In some implementations, a COS (Class Of Service) is used as detailed in the RPR specification so as to prioritize traffic on the ring. This enables carriers to sell what are referred to as SLAs (Service Level Agreements) to their customers based on traffic volume at each priority level. For example, customer A might get X GB/month of Priority 1 traffic and Y GB/month of Priority 2 traffic, etc. while customer B may get totally different traffic profiles.

In some implementations, the HCC 76 is partially powered from the phone lines so there is no dependency on household current supply for land line-based phone service. In some implementations, the household phone jack 68 and the traffic processor 62 are powered by at least one of the phone lines 40, 42 while the remaining components may be powered by household current (i.e., would have to be 'plugged in'). For example, each phone line could supply power via the potential difference between the first copper wire 78 at −48V and the second copper wire 80 at 0 V in a DC-based architecture. The LPFs 44, 46, 48, 50 remove digital signals from the westbound phone line 40 and the eastbound phone line 42. By using power from the phone lines 40, 42, lightning threats to CO equipment are reduced, as the lightning strike could be eliminated or reduced by the first homes that it touches in either direction.

In some implementations, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (i.e., user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some implementations, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO). Third, having a star topology means that no one else can 'listen' to another's phone calls, as there is no one else in the transmission path. In some implementations, the HCC provides similar capability via encryption.

Regarding the encryption of traffic, in some implementations all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the HCC 76, specific example interfaces are shown. In one particular example, an HCC has an Internet firewall/VPN (Virtual Private Network), 2 or 3 phone jacks (RJ11), a USB port for memory expansion and maintenance access, a WiFi interface, a femtocell interface and one or more Ethernet cable jacks (RJ45). However, more generally, any suitable interface or combination of suitable interfaces may be implemented. Also in the illustrated example, processing is accomplished using a specific implementation of processors and memory. More generally, processing may be accomplished using any appropriate implementation of hardware, firmware, one or more components which execute software, or any appropriate combination thereof. The minimum functionality that would be included in each communications node is a traffic add/drop function. In the above example this is implemented in the traffic processor 62 but other implementations are possible.

Other Wireline Topologies

The above description has focused on a ring topology. However, it is to be understood that a ring topology is not required. More generally, any appropriate topology interconnecting communication nodes may be implemented. A "communication node" generally refers to any node adapted to communicate with other nodes. A communication node may be a customer communication node, which is a node having an HCC and being associated with a user or household, or a central office communication node, which is a node associated with a central office. At least one of the nodes functions as a network switching device to interconnect the subscriber ring to the network. This node accepts traffic from the ring and forwards it on, and receives traffic for the ring and puts it onto the ring. In the example of FIG. 1, the network switching device is the central office 20, while in the example of FIG. 3 described below, the network switching device is a gateway node in a pedestal; also known as a splice box or a distribution point. More generally still, the network switching device can be physically placed at any point, including mid-span, between the CO and the first customer. Of course, increasing the distance to the first customer will reduce the bandwidth capabilities on that link.

An example of another topology is a linear ADM or "Daisy Chain" topology. A linear ADM topology may be implemented whereby a set of communication nodes are connected together in series. A ring topology is a topology in which two end communication nodes are interconnected.

Other Ring Networks

Figure 3:
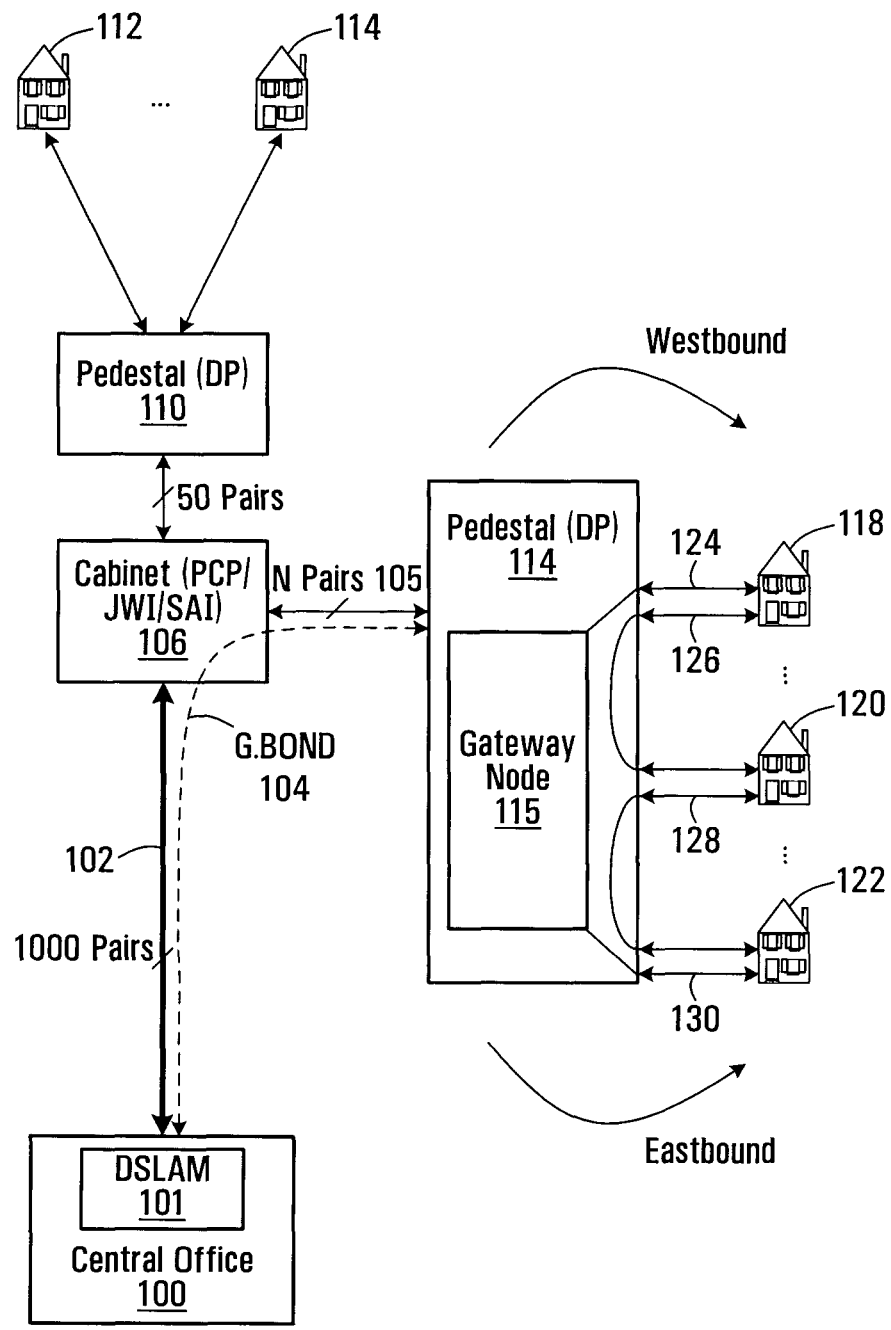
FIG. 3 is a block diagram of another network containing both a star implementation and a ring network topology.

Referring now to FIG. 3, another example of a DSL ring network is shown. A set of households 118, 120, 122 is connected in a ring configuration. The first household 118 is connected via 124 to a gateway node 115 forming part of a pedestal or DP (Distribution Point) 114. Similarly, household 122 is connected via 130 to the gateway node 115. The remaining households are connected in a ring similar to that of FIG. 1, but in this case the connections between consecutive houses on the ring go back through the pedestal 114. Thus, a connection 126 is shown between households 118 and 120, and a connection 128 is shown between households 120 and 122. More generally, an arbitrary number of households would be included on the ring. The pedestal 114 is shown connected via N Pairs 105 to a cabinet 106 (often called a Primary Connection Point—PCP—or Jumper Wiring Interface—JWI—or Service Access Interface—SAI—depending on the terminology of the network operator) which in turn is connected to a CO 100 having a DSLAM 101. The pedestal 114 is connected to the CO 100 via the N Pairs 105 and N of the 1000 pairs 102 in a manner similar to that described in G.Bond (ITU 998.1/2/3) 104. For the purpose of comparison, also shown is a conventional pedestal 110 connected to households 112, 114 in a star topology.

A pedestal typically includes a number of incoming pairs from a network, and a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

For the pedestal 114 that is participating in the DSL ring, only pairs 124 and 130 are connected to the gateway node 115. The remaining connections are between adjacent households. This can be achieved by making connections on a patch panel that forms part of the pedestal 114. For example, the interconnection 126 between households 118 and 120 can be achieved by connecting a jumper cable between a first pair going from the pedestal 114 to the first household 118, and a second pair going to the second household 120. In this manner the configuration of the DSL ring is very flexible and can easily be changed by simply modifying the set of patches. In the illustrated example, the bandwidth from the CO 100 to the pedestal 114 is provided through a bonding approach.

In particular, a set of pairs from the DSLAM 101 can be grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth, this bandwidth may be passed around the ring with 64 Mb, or in any other proportion desired, being transmitted in each direction by the gateway node 115. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

Figure 4:
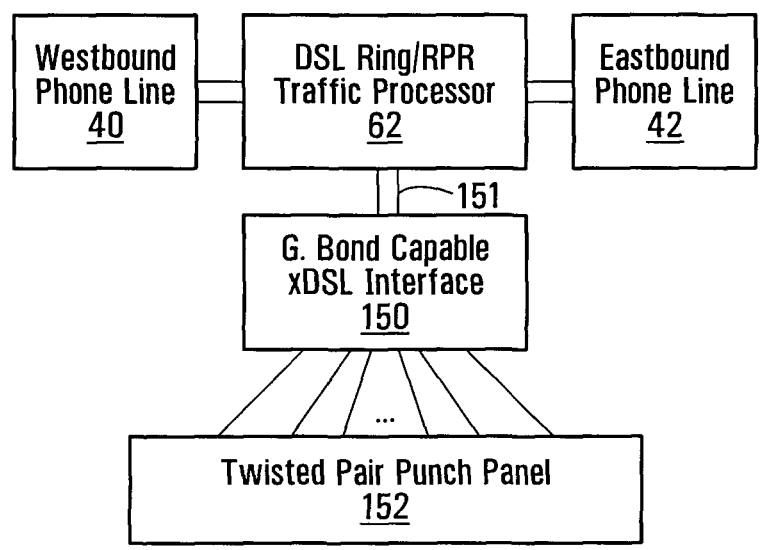
FIG. 4 is a block diagram of an example gateway node.

In some implementations, the gateway node 115 behaves very much the same as the HCC on any of the households. FIG. 4 shows additional functionality that might be included in some gateway node implementations. This includes a G.Bond-capable xDSL interface 150 and a twisted pair punch panel 152. More generally, any set of components capable of exchanging traffic with the main network and the DSL ring can be used. This can be included in a gateway node that also includes a traffic processor 62 that is basically the same as in the HCC described above. In this case, the G.Bond-capable interface 150 behaves in the same way as a communications device on the above described HCC, and is shown connected to an add/drop port 151 of the traffic processor 62; the only difference here is that substantially all of the traffic will be going to/from that device, with the possible exception of any traffic that might be terminated at the gateway node per se. A gateway node may include additional communications interfaces such as USB port(s), WiFi ports, a femtocell interface, etc., as described for the HCC 76 (FIG. 2).

As can be seen from FIG. 3, the G.Bond protocol 104 is used to obtain maximum bandwidth from the CO 100 to the pedestal 114. The gateway node 115, which may be environmentally hardened and powered via the twisted pairs from the CO 100, terminates the G.Bond 104 traffic and acts as a gateway for the DSL ring.

In some implementations, at each node in the ring is a full ADM, based on VDSL2. The DSL transmission distance starts at zero again on each individual hop. In most cases these hops back to the pedestal and then to the neighbour's house are less than 300 meters (<1000 ft). VDSL2 bandwidth at this distance is in the >100 Mb/s range (depending on the VDSL2 chipset manufacturer's specifications and the cable quality).

With rings there are two paths into and out of each house, each with the potential capability of carrying >100 Mb/s. Therefore the bandwidth potential for this scenario is potentially greater than 200 Mb/s (100 Mb/s eastbound and 100 Mb/s westbound) depending on the number of bonded pairs and the actual distance from the DSLAM to the pedestal. Basically the greater the number of subscribers on the ring, the greater the bandwidth pool available due to the greater number N of pairs available for bonding in the G.Bond 104 stream.

Rings also have the advantage of protecting themselves such that, if a single pair on the ring is cut, the traffic can be sent in the opposite direction to get to the gateway node. This is incredibly useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service.

In some implementations, LLU (Local Loop Unbundling) is accomplished. In some implementations this is achieved using the logical separation that is currently done via co-location in the CO (i.e., the traffic is carried by the incumbent from the customer to the CO and then handed off). In other implementations, another gateway node is installed in the pedestal along with co-location in the CO. This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another implementation, a wireless interface can be used through which the reach of the wireline network can be extended to reach other devices not connected directly by wireline connections. A second set of households can be connected in a similar manner as described for the main network, with wireline connections between pairs of households in a linear manner that might form a ring or linear ADM for example. At least one of the households of the second set has a wireless connection to one of the households of the first set on the ring, to thereby connect the second set of households into the ring.

In some implementations, as described above, a wireless interface is available for performing protection switching in the event of failure of one or more wireline connections.

In some implementations, a wireless connection can be used between the endpoints of two linear ADM topologies to complete a ring topology.

In some implementations, the ring transmission protocol is based on the IEEE 802.17 RPR standard with some modifications to allow for different possible bandwidths between nodes and overall lower peak bandwidths. RPR was designed for metro optical networks. Ethernet-based rings, implementing Ethernet Automatic Protection Switching (EAPS) according to ITU-T Recommendation G.8032/Y.1342, for instance, are also contemplated.

In some implementations, packet add/drop functionality is included in each node to add/drop packets. More generally, traffic add/drop functionality is included. This might include packet add/drop functionality, or traffic implemented using timeslots or wavelengths/frequencies to name a few specific examples.

In some implementations, the packet add/drop is in respect of DSL communication. This may for example be ADSL (Asynchronous DSL), ADSL2+ (Asynchronous DSL Version 2+), SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality.

Rings can also be interconnected through bonded links, so as to further extend the reach of DSL communications while providing the benefits of ring topologies such as those described above. Multiple DSL Rings, or multiple COs with one or more DSL Rings between them, can be chained together so that maximum bandwidth can be obtained at maximum distance from a CO in some implementations. For example, in one possible application, up to 400 Mb/s bandwidth is provided to suburban and rural areas in which subscribers are separated by distances, illustratively on the order of kilometers, which would be significantly larger than the maximum bandwidth distance.

Figure 5:
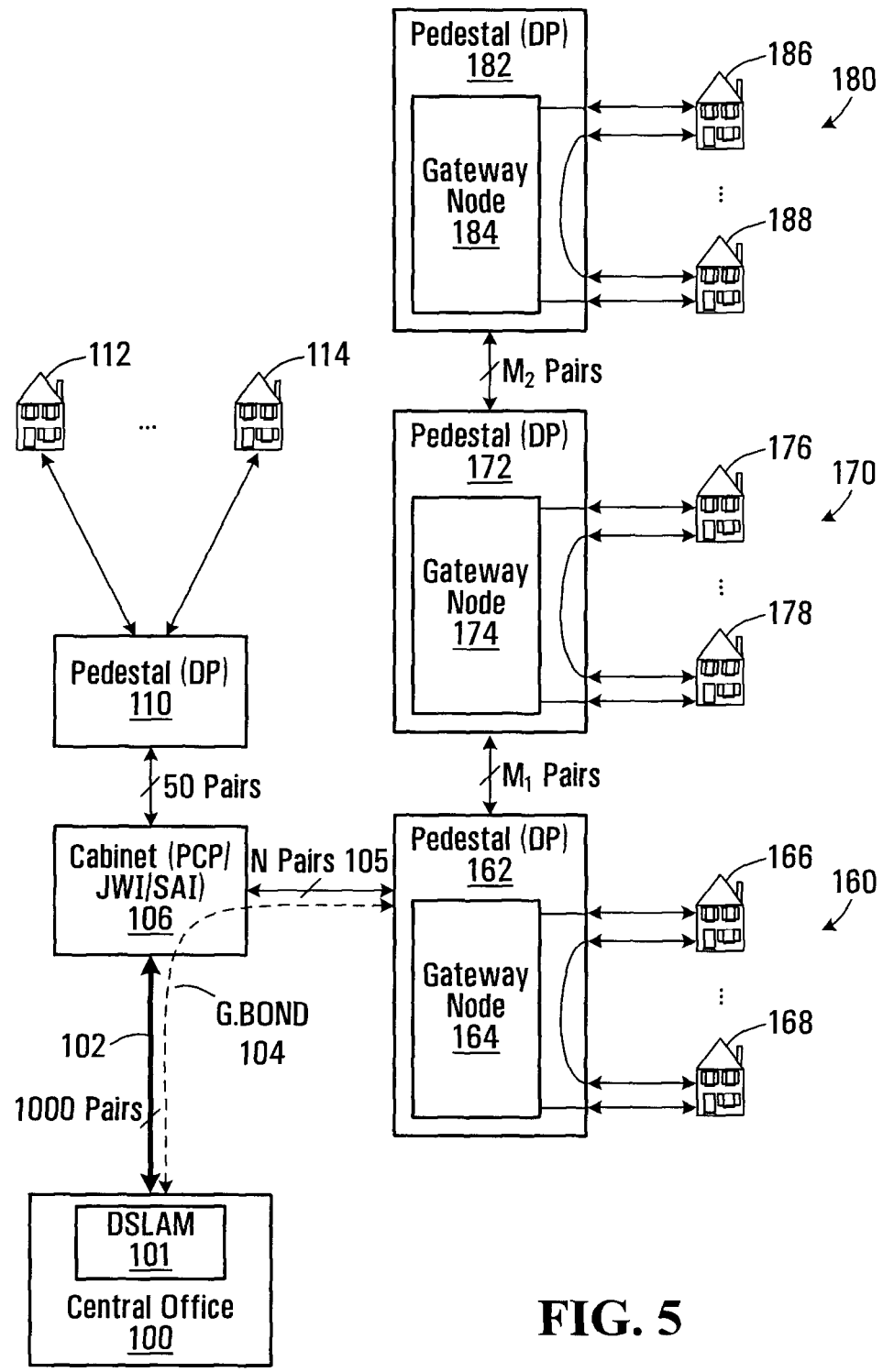
FIG. 5 is a block diagram of an example interconnected ring network topology.

FIG. 5 is a block diagram of an example interconnected ring network topology. As shown, this topology includes a DSLAM 101 located at a CO 100, a cabinet 106 connected to the CO through multiple pairs 102, and three interconnected ring networks 160, 170, 180. The first ring 160 is connected to the cabinet 106 through N pairs 105, the second ring 170 is connected to the first ring through $M_1$ pairs, and the third ring is connected to the second ring through $M_2$ pairs. Each ring 160, 170, 180 includes a pedestal, sometimes referred to as a splice box or distribution point, 162, 172, 182 having a gateway node 164, 174, 184 and one or more subscriber premises, two of which are shown as households 166/168, 176/178, 186/188 in each ring.

The topology shown in FIG. 5 is intended solely for illustrative purposes. An actual implementation may include further, fewer, or different components, interconnected in a similar or different manner than explicitly shown. For instance, the example topology might be used in a rural setting where there may be a string of pedestals (or splice boxes) that serve single residences only. In this case, a ring would be a 2-node ring, meaning a residence and a gateway node are the only nodes on that ring.

It should also be appreciated that G.Bond is one example of a bonding technique. Different bonding techniques, such as bonding according to IEEE 802.3ad Link Aggregation or IETF RFC 1990 PPP Multilink Protocol (MP) for instance, may instead be used.

The topology shown in FIG. 5 is also intended as an example. A chain of rings need not necessarily be implemented as a "stub" which terminates in a ring. For instance, a further bonded link could be provided back to the CO 100 from the ring 180, to thereby form a collector ring to which the subscriber rings 160, 170, 180 are coupled. This would provide additional redundancy in the case of cable cuts or other failures. In another possible scenario, the last bonded link is actually an interconnection to another CO rather than a local ring.

In an FTTN (Fiber-To-The-Node) or remote office case, the DSLAM 101 is not physically located in the CO 100 but in a remote cabinet, brick hut, or shed, for example.

Other variations, including implementations in which rings are interconnected using optical fibre connections and/or wireless links such as WiFi links instead of or in addition to copper wires for instance, are also possible.

More generally, it should be appreciated that the contents of FIG. 5, as well as FIGS. 6 to 9, represent non-limiting implementations of interconnected rings.

At the main network side, the CO 100 and the cabinet 106 may be identical to the corresponding components shown in FIG. 3. The main network may still provide service to a star topology including the pedestal 100 and households 112, 114, for example. Other functions at the main network side may also be unaffected by the interconnection of multiple rings 160, 170, 180 as shown in FIG. 5.

In the rings themselves, the pedestals 162, 172, 182, and in particular the gateway nodes 164, 174, 184, support additional functions to enable the ring interconnections. The first gateway node 164 terminates all available twisted pairs, depending on the number of pairs available and who owns them. In the example shown, this may include all of the N pairs 105. Terminating all pairs between the pedestal 162 and the CO 100, regardless of whether or not they are actually connected to houses on the ring 160, provides access to unused bandwidth on the copper pairs that might otherwise be used for subscribers who are only requesting POTS service.

These pairs, or more accurately all the available frequency bands on these pairs, are then logically bonded into a single communications link from the pedestal 162 back to the CO 100 or other communications traffic aggregation point, as shown at 104. Although only a single bonded link is shown at 104, respective subsets of the available pairs can be bonded to form multiple independent bonded links back to the CO 100, to be used for carrying different kinds or priorities of traffic, for example.

Once all the pairs, or their available frequency bands, are terminated, the pairs that connect to the premises 166, 168 serviced by the pedestal 162 are used to create the ring 160, which services those premises. Traffic from the local ring 160 may be added to any traffic generated by the downstream rings 170, 180 for transmission back to the CO 100.

The pairs that are terminated by the gateway node 164 at the pedestal 162 but are not dropped at the pedestal, i.e., any additional pairs that do not physically end at the ring 160, or strictly the frequency bands available on those pairs, can be logically bonded together by the gateway node 164 to create a single high-bandwidth link to the next pedestal 172 in the chain, and in some implementations to also provide electrical power to the downstream rings 170, 180. These pairs can carry all traffic to and from the next pedestal 172. When those pairs reach the next pedestal 172 (or splice box) they are terminated at the next gateway node 174. In the example shown, $M_1$ pairs are bonded between the first and second gateway nodes 164, 174 and terminated at the second gateway node.

As described above for the first gateway node 164, the second gateway node 174 terminates the $M_1$ pairs through which it is connected. In the example shown, $M_2$ additional pairs are bonded to form a bonded link to the third gateway node 184. The third gateway node 184 is the last gateway node in this example, and all $M_2$ pairs physically end at the pedestal 182 or in its local ring 180.

At the first and second gateway nodes 164, 174, if received traffic is destined for the local ring 160, 170 that drops from the corresponding pedestal 162, 172, the traffic is dropped to that ring. If the traffic is destined for another downstream ring 170, 180, it is passed on through a bonded link. The passthrough function could be provided via a QoS-enabled switch matrix or cross-connect that may, for example, be Ethernet-based or RPR-based.

In order to minimize delay at gateway node cross-connects for latency-sensitive traffic, minimal traffic queue sizes and a high-priority-weighted fairness forwarding implementation could be used. Latency-sensitive traffic could then be assigned high-priority status and handled accordingly.

The last gateway node 184 in a chain need not necessarily support the passthrough function since all traffic it receives from upstream nodes should be destined to its local ring 180. However, it is possible to have all gateway nodes in a chain support the passthrough function in order to support future expansion of a chain, for instance.

Figure 6:
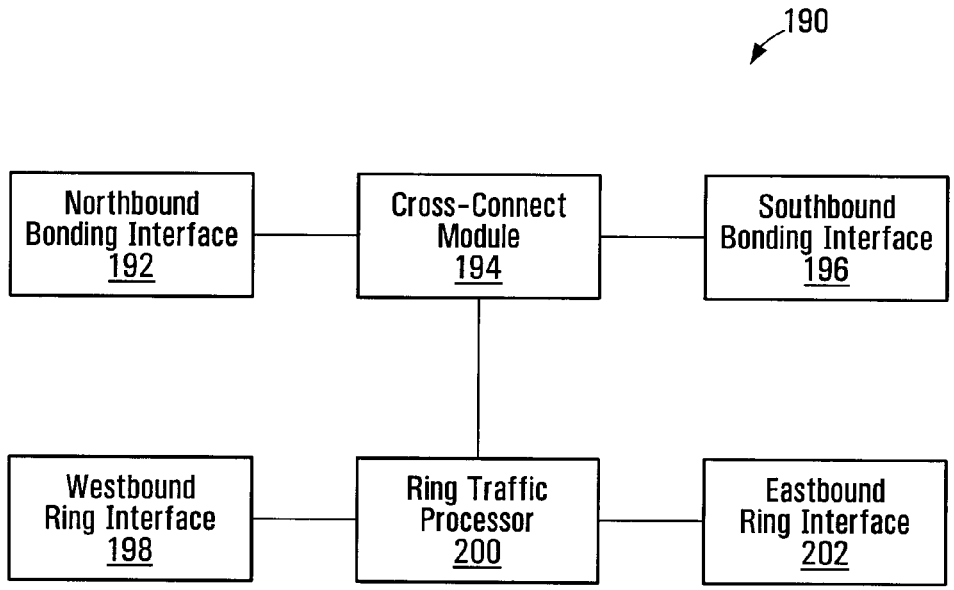
FIG. 6 is a block diagram of an example gateway node.

FIG. 6 is a block diagram of an example gateway node 190, which may be provided at least at a first pedestal and intermediate pedestals in a chained ring topology. A gateway node 190 could be provided at each of the pedestals 162, 172 (FIG. 5), for example. The gateway node 182 may have substantially the same structure as well, although cross-connect functionality and one of the bonding interfaces would not be needed in a far-end gateway node as noted above.

The example node 190 includes a cross-connect module 194 operatively coupled to a northbound bonding interface 192, to a southbound bonding interface 196, and to a ring traffic processor 200, which is operatively coupled to a westbound ring interface 198 and an eastbound ring interface 202. The directional labels on the interfaces 192, 196, 198, 202 are for the purposes of distinguishing directions along the chain and for distinguishing the chain or interconnect bonding interfaces 192, 196 from the ring interfaces 198, 202. These labels do not denote any dependence on actual interface locations or geographic directions of transmission of communication traffic through those interfaces.

Other components may also be provided in communication equipment in or in conjunction with which the gateway node 190 is implemented, but have not been explicitly shown in FIG. 6 in order to avoid overly complicating the drawing. A main processor and a main memory, for example, might be provided for implementing the cross-connection functionality and/or other functions, for example, as discussed above with reference to the main HCC processor 64 and the main HCC memory 66 in FIG. 2.

The bonding interfaces 192, 196 enable communications over respective bonded links. In one implementation, the constituent links that make up each bonded link are twisted pairs, or the frequencies used on such pairs, that have been logically bonded together to form one logical communication link. As discussed above with reference to FIG. 5, the bonded links at each side of a gateway node may include different numbers of constituent links. In some implementations, the bonded links include the same number of constituent links.

References herein to links or bonded links are intended to include physical connections and/or logical connections. For example, twisted pairs are physical connections, and the frequencies available on those physical connections can be bonded together to form a bonded link. The pairs, the frequencies available on those pairs, or both, may be considered examples of links in the context of the present application.

Each of the interfaces 192, 196 may be a G.Bond-capable xDSL interface such as the interface 150 (FIG. 4). It will thus be apparent that the gateway node 190 may be substantially similar to the gateway node shown in FIG. 4, although with an extra interface to a bonded link and a cross-connect module 194. The exact structure and function of the bonded interfaces 192, 196 will be implementation-dependent. In other implementations, the bonding interfaces 192, 196 implement IEEE 802.3ad Link Aggregation. It would also be possible to implement different types of bonding interfaces in the same gateway node, although in most implementations, it is expected that the bonding interfaces 192, 196 will be of the same type.

Communication traffic flow between interconnected rings, and also to and from a local ring, is controlled by the cross-connect module 194, which may be implemented in hardware, one or more components which execute software, firmware, or a combination thereof. Traffic passthrough along a chain of rings, addition of traffic to the chain for transmission from a local ring, and dropping of traffic to the local ring are handled by the cross-connect module 194. Microprocessors, NPUs (Network Processor Units), ASICs (Application Specific Integrated Circuits), PLDs (Programmable Logic Devices), and FPGAs (Field Programmable Gate Arrays) are examples of devices that might be used to implement the cross-connect module 194. Given the wide range of implementation choices available for the cross-connect module 194, this module is described in detail below primarily in terms of its function. The functional description provided herein would enable a person skilled in the art to implement bonded interconnections in any of various ways.

The ring interfaces 198, 202 enable the gateway node 190 to communicate with the first and last subscriber premises on a local ring. The local ring is constructed by using twisted pairs to connect subscriber premises equipment in one implementation, and in this case the ring interfaces 198, 202 are twisted pair interfaces.

The ring traffic processor 200 may be substantially the same in structure and function as the traffic processor 62 (FIGS. 2 and 4), which has been described above. The addition of the cross-connect module 194 and the two bonding interfaces 192, 196 instead of one need not affect the operation of local ring components such as the ring traffic processor 200 and the ring interfaces 198, 202. The local ring components operate in substantially the same way whether implemented in a single ring or a chained ring topology.

Operation of the gateway node 190 will now be considered in further detail with reference to FIGS. 5 and 6. In the downstream direction, from the main network to a subscriber, the CO 100 sends traffic on the bonded DSL link shown at 104 to the gateway node 164, which resides in the wiring pedestal 162. For the purposes of this illustration, it will be assumed that a single binder group (typically 24 or 25 copper twisted pairs) is passed from the CO 100 to the pedestal 162, and that a single Telco owns the binder group. It will also be assumed that there are 3 subscriber premises serviced by each pedestal 162, 172, 182, each with at least 2 pairs connecting them to the pedestal. To implement the ring 160 from the pedestal 162 only (i.e., using only jumper wires) 2 pairs are connected from the pedestal to each subscriber premises 166, 168. One pair from the subscriber premises 166 is jumpered to one of the pairs of the next subscriber premises 168, and so on, in implementations including more than two subscriber premises on a local ring, until one pair from the last subscriber premises 168 is connected back to the pedestal gateway node 164.

The first gateway node 162 that the binder group encounters terminates all pairs even if the subscriber premises that they are originally destined for are serviced by another pedestal 172, 182 further downstream. This may or may not apply to customers who prefer to still receive POTS-only service. As there are different physical implementations of that case, only the case of pseudo-POTS, where POTS traffic is converted to VoIP in an HCC prior to being put on a ring will be considered in this illustration. One possible mechanism for supporting POTS-only service has been disclosed in U.S. Patent Application Ser. No. 60/977,381, filed on Oct. 4, 2007, entitled "REMOTE POWERING OF DSL ADMS", the entire contents of which are incorporated herein by reference.

All of the communication traffic from the CO 100 is fed into the cross-connect module 194 in the first gateway node 164 at the pedestal 162, through its upstream bonding interface, illustratively the bonding interface 192. The cross-connect module 194, which as described below may support such traffic handling functions as CoS and QoS, on the basis of traffic priorities for instance, determines whether the traffic is destined for the subscriber premises serviced by its own pedestal 162 or another pedestal 172, 182 further downstream. If the received traffic is destined for subscribers serviced by the pedestal 162, or the gateway node 164 itself in the case of control packets, the cross-connect module 194 drops the received traffic to the local ring that originates from the gateway node. Control packets remain in the gateway node 164. Traffic to be dropped to the local ring is passed to the ring traffic processor 200, where the decision of which direction to send the traffic around the ring is made, as described above. The traffic is then passed to its destination via the local ring.

If the cross-connect module 194 determines that the received traffic is not destined for its own local ring (i.e., it is passthrough traffic), it passes that traffic to the downstream bonding interface, which is the bonding interface 196 in this example. The bonding interface 196 logically bonds several ($M_1$) pairs together. The number of pairs that are bonded together at the bonding interface 196 might be chosen so that the maximum possible xDSL bandwidth is available between the pedestals 162, 172. As the distance to the next pedestal 172 is likely less than the distance from the CO 100 to the first pedestal 162, it is also likely that fewer pairs would need to be bonded together to achieve the maximum bandwidth.

Separate power pairs may also be used in the downstream case. Typically, twisted pair cable that holds a single binder group is installed when a twisted pair network is being deployed. At each pedestal, the cable is brought out of the ground to the surface, a few pairs are broken out, and the cable is put back into the ground. The "tails" of the broken out pairs are virtually always left in the cable and are generally called "bridged taps". In some cases, the pairs that are broken out of the cable are not cut, but just partially stripped to be put into the punch block. This can actually cause electrical issues that in turn create problems for DSL communications. In this respect, implementations of bonded interconnections can provide a further advantage in that these bridged taps are eliminated by terminating all pairs at each pedestal. The "tails" that are still physically in the cable bundle but might not normally be connected to anything can still be used, however, for downstream bonded links and/or powering downstream components.

The passthrough traffic is received at the next pedestal 172 through its upstream bonding interface 192 and then fed into the cross-connect module 194. The same determination of drop or passthrough is made and the same actions are undertaken. In this example there are 3 gateway nodes 162, 172, 182 that are daisy-chained together in this manner. In the last gateway node 182, it is not necessary to implement a cross-connect module 194 or a downstream bonding interface 196, however, since all traffic forwarded to the gateway node 184 should be destined either for the gateway node itself or the last ring 180. The last gateway node 182 may thus be the same as the gateway node 115 (FIG. 3) in some implementations. The cross-connect module 194 and a downstream bonding interface 196 could still be implemented in the gateway node 184 to provide for future expansion.

In the upstream direction, starting at the last gateway node 184 in the chain, traffic is added to the ring 180 by any of the subscriber premises 186, 188 serviced by the pedestal 182. The traffic is forwarded to the upstream bonding interface 192 at the gateway node 184 once it is recognized that the traffic is destined for the main network or an upstream ring 160, 170. This traffic could include control traffic generated by the gateway node 184 and destined for the network or upstream gateway nodes 164, 174. The upstream bonding interface 192 forwards the traffic to the next gateway node 174 in the chain. At the second gateway node 174, the traffic is fed into the cross-connect module 194 through the downstream bonding interface 196.

The cross-connect module 194 determines the destination of the traffic and drops it to the ring traffic processor 200 of the local ring and/or passes it towards the network on its upstream bonding interface 192. This process may continue, depending on the destination of the traffic, at the gateway node 164 and possibly until the traffic is terminated at the DSLAM 101 in the CO 100.

The cross-connect module 194 may support functions such as QoS, as described in further detail below, and/or efficient multicast. Efficient multicast allows for a single instance of some traffic to be sent to multiple end points instead of the standard Ethernet implementation of uni-cast. Efficient multicast is a standard feature of RPR. One example of traffic that might be sent via the efficient multicast facility are femtocell synchronization packets, as described in further detail below. Femtocells are new, small cell sites that would physically reside in a house. To allow for hitless call hand-off between these small cell sites, which could be implemented in an HCC for example, femtocell nodes are synchronized with each other to a very high degree. In one possible implementation, a single packet would be sent from a DSLAM in a CO and have the highest priority attached to it. The packet would be received at the cross-connect module in the first pedestal, where it would drop to the local ring and continue to the next gateway node. Other types of traffic may also be subject to such multicast or multi-destination handling.

A gateway node thus represents one example of an apparatus having a cross-connect module 194 to be operatively coupled to a local ring communication network, and first and second bonding interfaces 192, 196, operatively coupled to the cross-connect module, that terminate and thereby enable communications over respective first and second bonded links. In the case of the first gateway node 164, the upstream bonding interface 192 might couple the gateway node to the CO 100 through the cabinet 106 and the downstream bonding interface 196 might couple the gateway node to a remote ring 170, or in some cases to another CO. The bonding interfaces 192, 196 of the second gateway node 174, however, couple the gateway node to respective remote rings 160, 180, through their corresponding gateway nodes 164, 184.

The cross-connect module 194 is operable to receive communication traffic, to determine whether the received communication traffic is to be forwarded to one or more of the local ring communication network and the first and second bonding interfaces 192, 196, and to forward the received communication traffic in accordance with the determination.

As described in detail above, where the communication traffic is received from the local ring communication network, through the ring traffic processor 200, the cross-connect module 194 is operable to determine whether the received communication traffic is to be forwarded to one or more of the first bonding interface 192 and the second bonding interface 196. If communication traffic is received through one of the first and second bonding interfaces 192, 196, the cross-connect module 194 determines whether the received communication traffic is to be forwarded to one or more of the other of the first and second bonding interfaces and the local ring communication network.

The first and second bonded links include different numbers of constituent links in some implementations, shown as N, $M_1$, $M_2$ in FIG. 5. The first bonding interface 192 terminates the constituent links of the first bonded link, and constituent links are similarly bonded together by the second bonding interface 196 to form the second bonded link. In the case of the second gateway node 174, for example, the upstream bonding interface 192 terminates $M_1$ constituent links, and $M_2$ links are bonded by the downstream bonding interface 196 to form the bonded link to the next gateway node 184. In other implementations, the first bonded link and the second bonded link have the same number of constituent connections.

Not all of the links terminated by a gateway node need necessarily be used to construct a local ring and a bonded downstream link. There may be additional incoming bonded, and/or possibly unbonded, links that are unused, such as to provide for future expansion of a local ring, or used for other purposes, such as providing POTS to subscriber premises.

Figure 7:
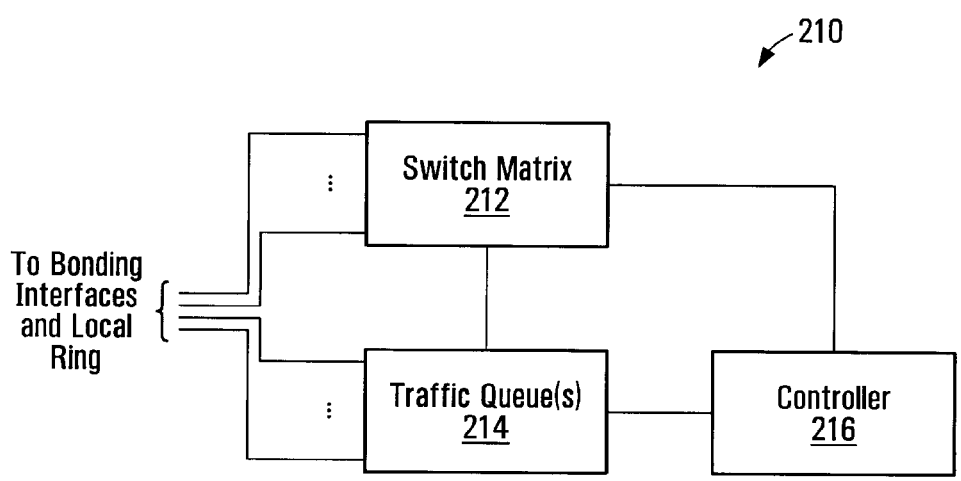
FIG. 7 is a block diagram of an example gateway node cross-connect module.

As noted above, the cross-connect module 194 may support CoS, QoS, and possibly other traffic handling functions. FIG. 7 is a block diagram of an example gateway node cross-connect module 210.

The module 210 includes a switch matrix 212, a controller 216, and one or more traffic queues 214. At least the switch matrix 212 and the controller 216 may be implemented in hardware, one or more components which execute software, and/or firmware. An FPGA is used in one implementation.

The traffic queue(s) 214 would be provided in the aforementioned FPGA or some sort of memory device, such as a solid-state memory device, although other types of memory devices, including those using fixed, movable, or even removable storage media, may also or instead be used.

With reference to both FIGS. 6 and 7, the switch matrix 212 would be operatively coupled to the bonding interfaces 192, 196 and to the local ring communication network through the ring traffic processor 200. The controller 216 controls the switch matrix 212 to switch received communication traffic between the upstream bonding interface 192, the downstream bonding interface 196, and the local communication ring, to thereby forward the received communication traffic toward its destination in the local ring through the ring traffic processor 200, a remote ring, or the main network.

The set of one or more traffic queues 214, would also be operatively coupled to the bonding interfaces 192, 196 and to the local ring communication network through the ring traffic processor 200, and is for storing the received communication traffic. The traffic queue(s) 214 may include one or more queues for storing received communication traffic when the traffic is received and until it is forwarded. In another implementation, one or more receive queues are provided to store the traffic when it is received, and one or more separate transmit queues are also provided to store the traffic prior to forwarding. Traffic might be moved from a receive queue to a transmit queue when it is scheduled for transmission, for instance.

Storage of received communication traffic in the traffic queue(s) 214 represents one possible implementation for supporting special traffic handling mechanisms such as QoS. For example, the traffic queue(s) 214 may include respective queues for storing received traffic having different priorities, and those priorities could be serviced differently by the controller 216. Latency-sensitive traffic could be assigned a highest priority and serviced first by the controller 216. The controller 216 might detect queue levels in the traffic queue(s) 214 and switch the highest priority available traffic out of the traffic queue(s) through the switch matrix 212 first, before lower priority traffic is serviced. A similar approach could be applied to traffic associated with different classes of service, or based on some other traffic type delineation. Thus, the controller 216 might determine a priority of received communication traffic and forward the traffic in accordance not only with the forwarding determination, but also in accordance with the determined priority.

The actual QoS, CoS, and/or priority scheme(s) used in conjunction with bonded interconnections may vary according to implementation. For example, the cross-connect module 194 and its controller 216 may provide a traffic handling mechanism that is based on Ethernet, RPR, and/or VDSL2, with modifications to support priority-based QoS, depending on the underlying technology and protocol used for inter-ring connections. Other possible mechanisms may be or become apparent to those skilled in the art.

Any of various forwarding mechanisms may also be used. According to a store-and-forward mechanism, the controller 216 may wait until a complete packet or other form of traffic block is stored in the traffic queue(s) 214 before switching that packet or block through the switch matrix 212. In order to reduce delays, however, the controller 216 might instead switch traffic out of the traffic queue(s) 214 once it determines the destination of the traffic, illustratively by examining a packet header, without waiting for a complete traffic block to be received and stored in the traffic queue(s) 214. These considerations affect both latency and depth of memory for the traffic queue(s) 214.

Additional functions may also be provided by a cross-connect module. For example, the switch matrix 212 or possibly another component of a cross-connect module or gateway node might provide a translation function to translate received communication traffic. Where the switch matrix is RPR-based for instance, the translation function might translate received communication traffic between RPR and Ethernet and/or ATM (Asynchronous Transfer Mode) for communications with a DSLAM.

Figure 8:
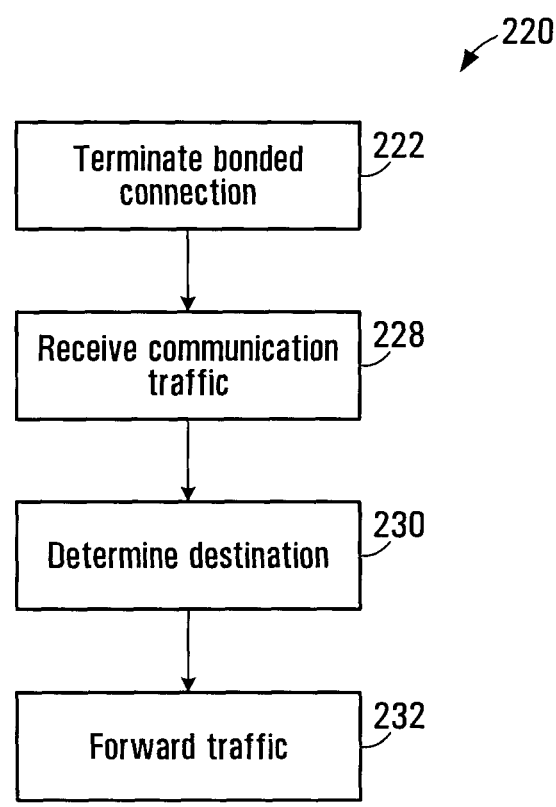
FIG. 8 is a flow diagram of a method relating to bonded interconnections.

Implementations of bonded interconnections have been described above primarily in terms of systems and apparatus. FIG. 8 is a flow diagram of a related method.

The method 220 begins at 222, with an operation of terminating a bonded link that includes multiple constituent links. The bonded link enables transmission and reception of communication traffic. At a gateway node, multiple bonded links are provided. Communication traffic is received from a local ring communication network or a bonded link at 228. A determination is then made at 230 as to whether the received communication traffic is to be forwarded to one or more of the local ring communication network and one of first and second bonded links. At 232, the received communication traffic is forwarded in accordance with the determination.

The method 220 is intended for illustrative purposes. Further, fewer, or different operations may be performed in a similar or different order. For instance, the operations 228 through 232 may be repeated as communication traffic is received. Additional operations associated with a QoS mechanism, traffic priorities, and/or traffic translation have not been shown in FIG. 8, but may be provided.

The operations shown in FIG. 8 may also be performed in various ways, at least some of which will be evident from the foregoing description of systems and apparatus. Further variations may be or become apparent to those skilled in the art.

A communication system may thus include gateway nodes serially coupled together through respective bonded links. Such a system includes at least a first gateway node and a last gateway node. Multiple ring communication networks, each of which includes a respective one of the gateway nodes and at least one subscriber node for providing a communication service to subscriber premises, are also provided. Each of at least the first gateway node and any intermediate gateway nodes between the first gateway node and the last gateway node includes a cross-connect module that receives communication traffic, determines whether the received communication traffic is to be forwarded to one or more of the local ring communication network and a bonded link that is operatively coupled to the gateway node, and forwards the received communication traffic in accordance with the determination.

The cross-connect functionality may be used to provide any of several advantages. For example, with a cross-connect function, multiple links may be bonded together to enable higher bandwidths to be obtained over longer distances than would otherwise be possible in some technologies. In addition, the cross-connect feature allows traffic from downstream rings to be transmitted upstream more quickly by bypassing any intermediate rings. Referring again to FIG. 5 for instance, even if it were possible to service all of the subscriber premises 166/168, 176/178, 186/188 in a single ring, which might not always be the case, latency between the CO 100 and the downstream rings can potentially be reduced significantly by instead providing the multiple interconnected rings 160, 170, 180. Considering traffic to be transferred to the subscriber premises 176 from the CO 100, such traffic can bypass the intermediate ring 160 by being cross-connected through the gateway node 164. Latency could be substantially higher if the subscriber premises 176 were part of a larger ring, since such traffic might then have to pass through more ring nodes before reaching the destination subscriber premises 176.

Figure 9:
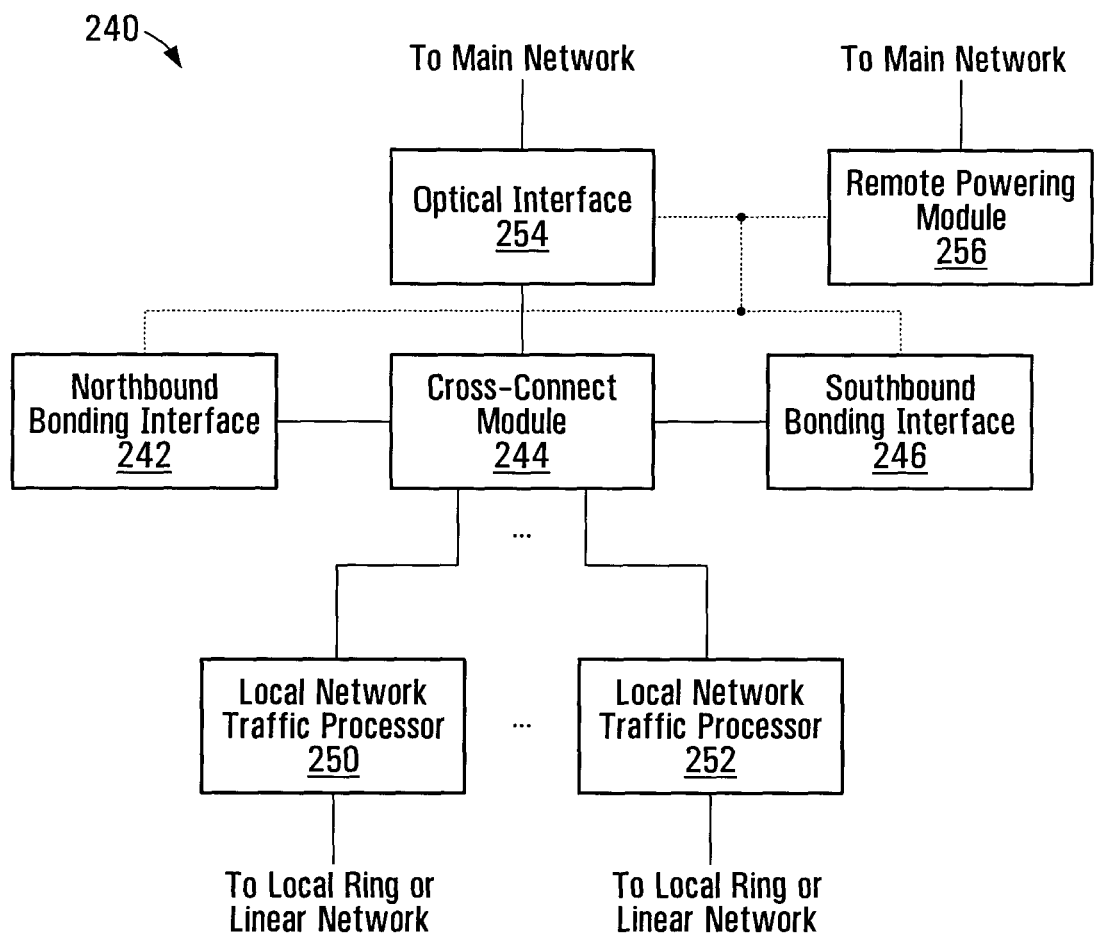
FIG. 9 is a block diagram of another example gateway node.

Additional system variations are also contemplated, and several of these are illustrated in FIG. 9, which is a block diagram of another example gateway node. The gateway node 240 is substantially similar to the gateway node 190 in FIG. 6, and includes a cross-connect module 244 operatively coupled to a Northbound bonding interface 242 and a Southbound bonding interface 246. The gateway node 240 also includes multiple local network traffic processors, two of which are shown at 250, 252, which are operatively coupled to the cross-connect module 244 and would also be operatively coupled to one or more local network interfaces. The local network interfaces have not been shown in FIG. 9 so as to avoid overly complicating the drawing. An optical interface 254 is operatively coupled to the cross-connect module 244, and a remote powering module 256 is operatively coupled to the cross-connect module and to the interfaces 242, 246, 254 in the example shown.

The bonding interfaces 242, 246, as described above, enable communications over respective bonded links. The cross-connect module 244 may also be implemented substantially as described above, although in the example gateway node 240, the cross-connect module includes additional ports or connections for which a forwarding determination is made.

Each local network traffic processor 250, 252 is part of a local communication network. A local communication network may be a ring network or a linear network, for example. In the case of a ring network, a local network traffic processor 250, 252 may be implemented as a ring traffic processor such as the ring traffic processor 200 shown in FIG. 6. A linear network traffic processor may be substantially similar in structure and operation, although only one local network interface would then be needed. A linear network traffic processor need not support ring switching functions, such as choice of transmission direction or loopback in the event of a failure. In one possible implementation, the same traffic processor is used for ring and linear networks, and configured differently depending on deployment.

In a similar manner, a common structure could be used for the cross-connect modules 194, 244. For example, a cross-connect module might include ports or connectors for all of the components shown in FIG. 9, but not all of those ports or connectors would necessary be "populated" or connected in any specific implementation. There might be only one local network in some implementations, and other implementations might include multiple local networks but no optical interface. Thus, a common equipment structure could be deployed and connected and/or configured differently depending on deployment.

The optical interface 254 enables communications with a main communication network over an optical communication link. This interface might be in the form of an RPR-based optical ADM, for instance, where the optical link is part of an optical RPR collector ring. Other types of optical interfaces will be or may become apparent to those skilled in the art.

As noted above with reference to FIG. 6, one of the bonding interfaces 242, 246 may support communications with a main network. The optical interface 254 represents another option for communicating with such a network, and illustratively with an upstream CO.

The remote powering module 256 is also operatively coupled to a remote component, in the main network, through one or more electrically conductive twisted wire pairs, and enables the gateway node 240 to be at least partially powered by that remote component through the twisted wire pair(s). Power connections are illustrated by the dashed lines in FIG. 9. Although the cross-connect module 244 and all of the interfaces 242, 246, 254 are powered by the remote powering module 256 in the example shown, not all components of a gateway node would necessarily be remotely powered.

Any of various power/current levels are possible, and may be implementation dependent. For example, telecom twisted pair current varies in the range of 23-120 mA and allowable operating voltage is between −42V and −60V, often depending on country and equipment provider. At present, most telecom line cards supply 25-45 mA of −46 Vdc to −52 Vdc, which provides a total of 1.15 W-2.34 W of power. Power conversion efficiencies are then applied to arrive at the total available power/pair. These conversion efficiencies are in the range of 80-90% in some implementations. Twisted pairs could instead be driven at higher voltage and/or current levels to provide higher available power.

The remote powering module 256 might include any of various forms of voltage and/or current converters to transform power on the twisted pairs to the voltage/current levels needed to power components of the gateway node 240. The above-referenced U.S. Patent Application Ser. No. 60/977, 381, for example, discloses powering arrangements that may be suitable for the remote powering module 256.

In the example shown, both the optical interface 254 and the remote powering module 256 are operatively coupled to the main network. This type of deployment would provide the most available pairs for powering the gateway node 240, since no pairs are used for communications with the main network. Where copper pairs are upgraded to an optical medium, the pairs could be left in place and used to power the gateway node 240. Remote powering is still possible when a bonded link over twisted pairs is used to communicate with the main network, although in this case fewer pairs would be available to the remote powering module 256.

FIG. 9 clearly illustrates multiple local networks operatively coupled to the cross-connect module 244. There may also be multiple links to the main network as well. In an example described above, an assumption was made that a binder group was owned by one telco. However, this is not always the case. For the sake of simplicity, assume that the Northbound direction is back to the main network, and that two different binder groups are owned by two different telcos. Two Northbound interfaces 242 could be provided to terminate those binder groups and thereby support two bonded links back to the main network. Respective local networks associated with each binder group or bonded link could then be provided so that each telco can service its customers. Thus, a single gateway node could be used to provide service to customers of two different telcos. In this particular example, the optical interface 254 need not be provided for communications with the main network.

As noted above, some embodiments of the present invention may be used in conjunction with DSL Rings to support high bandwidth communications with network backhaul. It should be appreciated, however, that FIGS. 1 to 9 and the foregoing description are intended solely as illustrative examples of the types of networks or topologies in conjunction with which embodiments of the invention may be implemented. Thus, the present invention is not necessarily limited to any particular types of network, topology, equipment, or protocols, for instance.

Overview

Some embodiments of the present invention relate to connecting high bandwidth wireless communication equipment with limited user servicing capabilities, such as femtocells, to a service provider's network via bonded links and DSL Rings. Mobility between different service areas is provided by synchronizing the wireless communication equipment installations that service such areas using a common synchronization source. Aspects of the invention may also be applied more generally, to synchronization of communication equipment such as ring nodes.

Any of several techniques may be used to provide femtocells and/or other communication equipment with a remote and cost effective synchronization source. Possible options include, for example, a packet approach, illustratively a packet-based IEEE 1588 protocol over Ethernet; a frequency reference standard approach over DSL; and a hybrid approach, which might use a packet-based approach at some nodes and a frequency reference standard approach at other nodes. When femtocells are implemented at gateway nodes and HCCs so that network backhaul is provided via the Ethernet/DSL backhaul pathway of a DSL Rings system, for example, the packet-based approach could be used at the gateway nodes and the frequency reference standard approach could be used at the HCCs, or vice versa.

Figure 10:
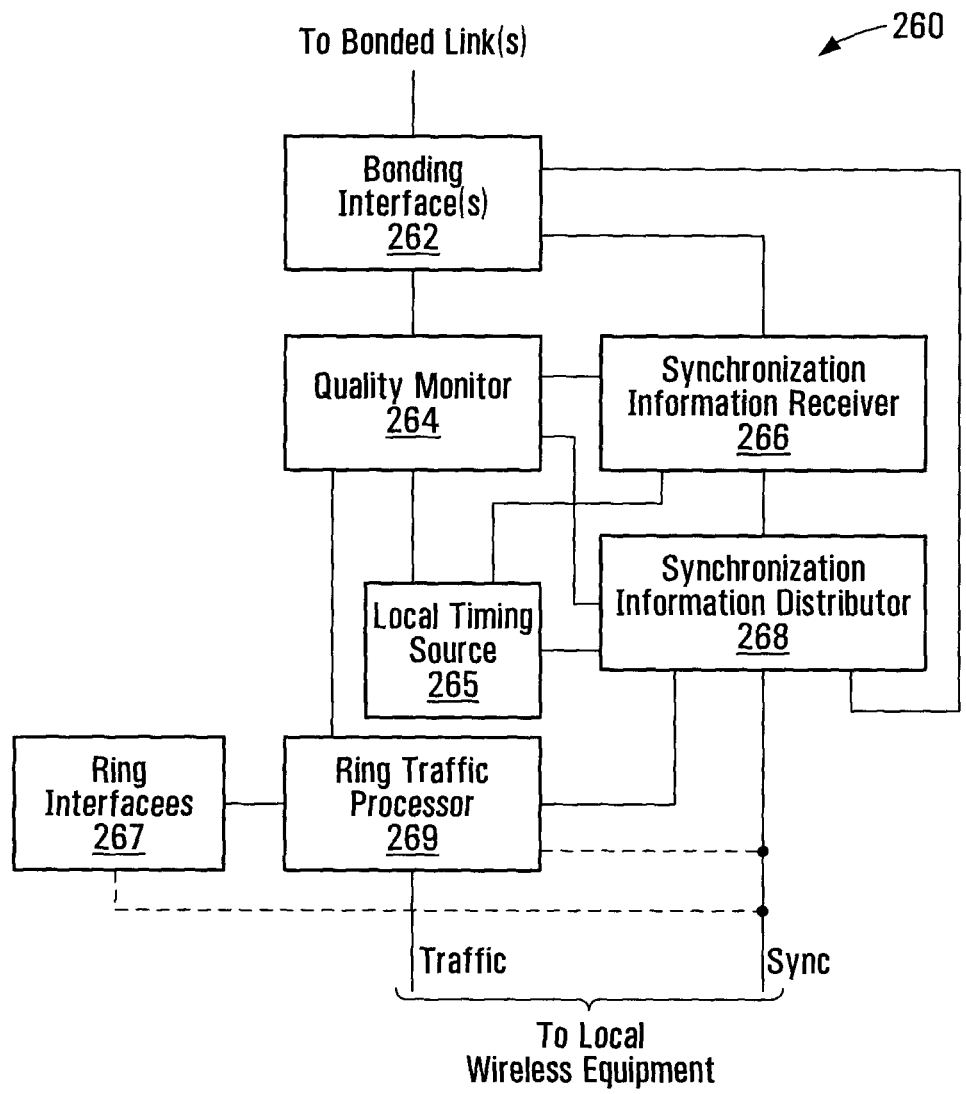
FIG. 10 is a block diagram of an example gateway node incorporating an embodiment of the invention.

FIG. 10 is a block diagram of an example gateway node incorporating an embodiment of the invention. The gateway node 260 includes one or more bonding interfaces 262, a quality monitor 264, a synchronization information receiver 266, a synchronization information distributor 268, a local timing source 265, ring interfaces 267, and a ring traffic processor 269, interconnected as shown. Other embodiments may include further, fewer, or different elements interconnected in a similar or different manner. For example, a gateway node may include only one or multiple bonding interfaces 262, depending on whether or not multiple local communication networks are being chained together through bonded connections, i.e., whether a topology such as shown in FIG. 3 or a topology such as shown in FIG. 5 is being implemented. It should also be appreciated that a gateway node may include other components as well, such as those shown in FIGS. 2, 4, 6, 7, and 9.

Examples of bonding interface(s) 262, ring interfaces 267, and the ring traffic processor 269 and their operation have been described above. Therefore, the following detailed description of FIG. 10 concentrates primarily on the quality monitor 264, the synchronization information receiver 266, the synchronization information distributor 268, and the local timing source 265. These components may be implemented using hardware, one or more components which execute software, firmware, or combinations thereof, to perform the functions described below.

The synchronization information receiver 266 receives, through a bonding interface 262, network synchronization information from a bonded communication link that enables communications with a communication network. The received network synchronization information is for synchronizing communication equipment with the communication network. In some embodiments, the communication equipment is wireless communication equipment that provides a wireless communication service. The wireless communication equipment may be associated with one or more wireless service providers or carriers, in which case the same infrastructure can be used to route synchronization information regardless of the entity that owns or operates the wireless communication equipment. The synchronization information may also or instead be used to synchronize other communication equipment, such as the ring traffic processor 269 and/or other components of a gateway node.

The synchronization information distributor 268 provides, based on the received network synchronization information, local synchronization information for synchronizing local communication equipment with the communication network, and remote synchronization information for transmission to further communication equipment. The remote synchronization information is for synchronizing the further communication equipment with the communication network.

In this manner, both local communication equipment that forms part of, or is at least connected to, the gateway node 260 and remote communication equipment that forms part of, or is at least connected to, nodes in a communication network, which would be ring nodes in a ring network in the example shown, can be synchronized to a main network. This enables the communication equipment, which might be femtocell sites for instance, to support high bandwidth communication service, including mobility of wireless communication devices between service areas, with network backhaul through a bonded communication link.

Distribution of the local and remote synchronization information is represented by the dashed lines in FIG. 10. The dashed line interconnecting the synchronization information distributor 268 and the ring interfaces 267 illustrate that the remote synchronization information could be distributed in the ring network directly through the ring interfaces, as might be the case where a frequency reference signal is used as the remote synchronization information, for example. The packet approach would likely involve distributing a remote synchronization packet through the traffic processor 269. The dashed interconnection between the synchronization information distributor 268 and the ring traffic processor 269 is intended to also illustrate the option of synchronizing local communication equipment, and not necessarily wireless communication equipment.

Remote synchronization information may also or instead be distributed through the local wireless equipment. In addition to being synchronized by the local synchronization information, the local wireless equipment could be used to transmit remote synchronization information to other communication equipment, and even to other networks such as other rings. Ring nodes in adjacent rings might be able to communicate with each other through their WiFi or femtocell interfaces, for example, and in this case those interfaces could be used to distribute synchronization information between nodes.

The local synchronization information may include any or all of the received network synchronization information, in cases where the local wireless equipment can use the network synchronization information directly. The synchronization information distributor 268 could thus be implemented as a connection to the local wireless equipment or an interface to such equipment.

Similarly, the remote synchronization information may include at least a portion of the received network synchronization information. In one embodiment, the synchronization information distributor 268 passes the received network synchronization information to both the local wireless communication equipment and to remote wireless communication equipment. Where the received network synchronization information includes a synchronization packet, for example, the synchronization information distributor 268 might provide the received synchronization packet as both the local synchronization information and the remote synchronization information. A frequency reference signal in the received network synchronization information could similarly be provided by the synchronization information distributor 268 as both the local synchronization information and the remote synchronization information.

The synchronization information distributor 268 may also or instead include a synchronization information generator to generate at least the remote synchronization information based on the received network synchronization information. For example, if the received network synchronization information includes a synchronization packet, the synchronization information distributor 268 might include both a connection to provide the synchronization packet as the local synchronization information, and also a synchronization information generator to generate as the remote synchronization information a frequency reference standard based on the received synchronization packet. This represents one example of the "hybrid" approach noted above.

A hybrid approach could also be applied where the received network synchronization information includes a frequency reference signal. The synchronization information distributor 268 could provide the frequency reference signal as the local synchronization information, and also include a synchronization information generator to generate as the remote synchronization information a synchronization packet based on the received frequency reference signal.

Other types of processing of received network synchronization information is also contemplated. In the packet approach, for example, the synchronization information distributor 268 might change the priority of a received synchronization packet in order to generate a synchronization packet as the remote synchronization information. In this case, the received synchronization packet might have a first priority, and the synchronization packet that is provided as the remote synchronization information might have a second, higher or lower, priority. In one embodiment, the received synchronization packet has a highest priority and the synchronization information distributor 268 changes the synchronization packet priority to a lower priority to generate the remote synchronization information. A synchronization information generator could similarly assign a relatively high priority or a relatively low priority to a synchronization packet that is generated on the basis of a received frequency reference signal.

Regarding actual transmission of the remote synchronization information, such information could potentially be transmitted from a gateway node such as 260 through any of multiple communication links. In one embodiment, the synchronization information distributor 268 provides the remote synchronization information to the ring traffic processor 269 for transmission in a local ring network. When a gateway node 260 is implemented in a chained topology as shown in FIG. 5, however, the synchronization information distributor 268 could also or instead provide the remote synchronization information to a bonding interface 262 for transmission through a further bonded communication link. With reference to FIG. 6, for example, a gateway node could receive network synchronization information through a northbound bonding interface 192 and forward remote synchronization information to a next gateway node through a southbound bonding interface 196.

In one embodiment, the synchronization information distributor 268 provides the remote synchronization information for transmission via QoS forwarding. The QoS forwarding could be priority-based QoS forwarding, for example, in which case the remote synchronization information might be associated with a highest priority of the priority-based QoS forwarding. The efficient multicast feature of RPR is one example of a QoS forwarding mechanism that could be used for this purposes. Other examples may be based on traffic prioritization features of RPR, Ethernet, and VDSL2, for instance.

The quality monitor 264 monitors a quality measure of the received network synchronization information, and might report a result of the monitoring through a bonding interface 262 via the bonded communication link over which the network synchronization information was received.

Quality monitoring may also or instead be used to select between multiple sets of redundant synchronization information. One of the multiple sets of redundant synchronization information could be selected for use as basis for at least the local synchronization information and possibly the remote synchronization information. The quality measure monitored by the quality monitor 264 might be respective error rates of the multiple sets of redundant synchronization information, for example. In this case, the set of redundant synchronization information having a lowest error rate might be selected.

The quality monitor 264 might also or instead receive quality monitoring information associated with the remote synchronization information and/or report a monitoring result to the further communication equipment. Results of quality monitoring might thus be reported over a network communication link, between installations of communication equipment such as in a ring network, or both. A quality monitor at a ring node that receives the remote synchronization information from the gateway node 260 may return quality information to the gateway node 260, which could in turn report a monitoring result through a network connection, for example.

A quality problem with the remote synchronization information could be detected by the quality monitor 264 based on received quality monitoring information. Responsive to detecting a quality problem, the quality monitor 264 could perform at least one of: causing a characteristic of the remote synchronization information to be adjusted, and reporting the quality problem via the bonded communication link. Thus, action could be taken at the gateway node 260 or at an upstream component to deal with a detected quality problem. For example, if the quality monitor 264 detects a quality problem, a synchronization information generator in the synchronization information distributor 268 might adjust the frequency bands in which the remote synchronization information is being transmitted, or the ring traffic processor 269 might avoid transmitting the remote synchronization information through a particular segment or node of the ring network.

Several options are available for quality messaging and/or problem reporting. For example, the quality monitor 264 could use a frequency reference signal as a messaging channel to report the result of the monitoring. The frequency reference signal could essentially be used as a carrier, for example. Synchronization-related messaging could also or instead use packets that are transmitted on shared or dedicated communication links.

Another aspect of the present invention relates to using a bonded communication link for synchronization. In one embodiment of the example gateway node 260, the bonding interface 262 enables the synchronization information receiver 266 to isolate a frequency reference signal from a DSL communication link which is a constituent link of a bonded communication link. The synchronization information distributor 268 can then provide, based on the received frequency reference signal, local synchronization information for synchronizing local communication equipment, illustratively wireless communication equipment, with the communication network.

The received frequency reference signal might be actual DSL traffic being transferred on the DSL communication link in some embodiments, and thus need not necessarily be a dedicated synchronization reference signal. In this case, the local synchronization information might be a clock signal that is recovered from the DSL traffic. The synchronization information distributor 268 could provide the recovered clock signal to the local communication equipment directly or through a filter, for example.

The synchronization information distributor 268 may also provide remote synchronization information for transmission to further communication equipment, as described above. The remote synchronization information may include the frequency reference signal. In some embodiments, the synchronization information distributor 268 includes a synchronization information generator to generate as the remote synchronization information a synchronization packet based on the received frequency reference signal.

Other functions, such as those described above, may be implemented in combination with the frequency reference signal isolation feature. Quality monitoring by the quality monitor 264, for example, might be implemented by determining error rates based on a dedicated PRBS (Pseudo-Random Bit Sequence) that is transmitted on an entire frequency band, thereby making it unusable for any network data transmission. Alternatively, quality can be monitored on a shared frequency band that is used for network data transmission, by monitoring a CRC (Cyclic Redundancy Check) packet field for errors.

A further function that may be provided in some embodiments is illustrated by the local timing source 265. The local timing source 265 is intended to generally represent a timing source that is synchronized using the received synchronization information.

The way network clock sources typically work is that there is a frequency-based filter that is applied to every reference to which it can lock. This is generally a very low-pass filter in normal operation, which may "open up" in the absence of a reference. What this filter does is eliminate any relatively quick changes in frequency or phase that may cause unwanted network effects.

The output of this filter is often digitized and a further digital filter is applied, with the filtered digital signal being fed into a DAC (Digital-to-Analog Converter). The DAC output is fed into a VCXO (Voltage Controlled Crystal Oscillator), which is the actual nodal clock source. In some embodiments, the synchronization information distributor 268 recognizes that its chosen reference, whether based on a synchronization packet or a frequency reference signal, has been lost. The local timing source 265, or the DAC in such a source in some embodiments, can then be fed with the last stable value that it was using prior to the loss of reference event.

In the example of a DAC and VCXO in the local timing source 265, even with the DAC being provided with the last stable value and thus providing the exact same voltage to the VCXO, the VCXO can still move its output in frequency and/or phase over time. For this reason, a feedback loop is typically provided to continuously compare the VCXO output with the incoming reference and continuously calculate what the correct VCXO input voltage should be. In fact, the digitized filter output signal described above is often called an error signal. Frequency and phase of the VCXO output are adjusted to minimize this error signal. In the event of a loss of the reference, however, the feedback loop is not effective, and output frequency and phase may drift due to stability limitations of currently available technology. Therefore, the synchronization information distributor 268 might continue to use an output of the local timing source 265 for only some predetermined amount of time, illustratively 24 or 48 hours, after loss of reference.

Thus, in some embodiments, the synchronization information distributor 268 may continue to provide local and remote synchronization information on the basis of previously received network synchronization information where no new network synchronization information is received during a holdover time period.

It should be appreciated that the above example using digital filtering, a VCXO, and a feedback loop, which is typical of PLL (Phase Locked Loop) implementations, is one example of a local timing source. Other implementations, including more passive implementations using SAW (Surface Acoustic Wave) filters and/or analog filters for instance, are also contemplated.

The interconnection of the local timing source 265 with the quality monitor 264 and the synchronization information receiver 266 may support any of several features. For example, where the synchronization information receiver 266 receives multiple references from a CO, the quality monitor 264 could select a best quality one of those references and the local timing source 265 could be locked to the selected reference. The output of the local timing source 265 could then be passed around a ring to synchronize communication equipment that is coupled to the ring, for instance. This provides a holdover capability in the ring in case the network references are lost.

In some embodiments, the quality monitor 264 ensures that any external references that are inferior to the local reference provided by the local timing source 265 are not used for synchronization. The quality monitor 264 could either use embedded information in an incoming synchronization signal, such as CRC or sync messaging, and/or measure the actual quality of the incoming signal against the known local reference from the local timing source 265.

Figure 11:
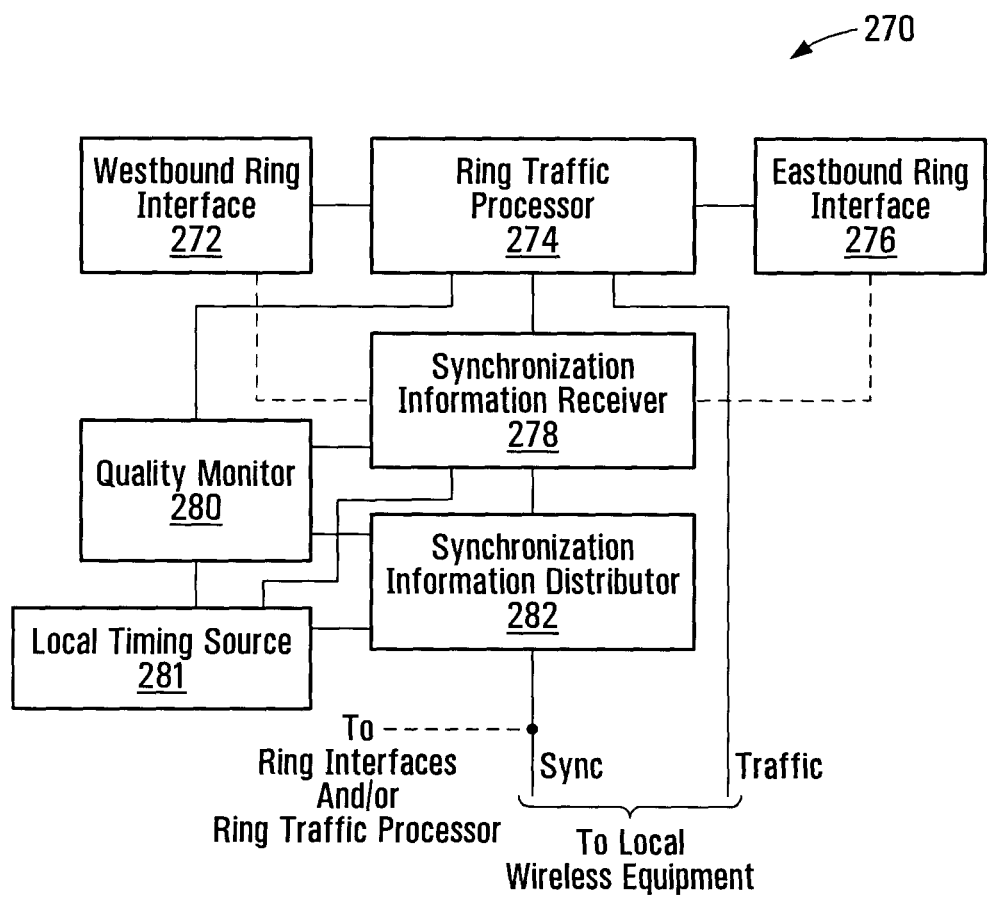
FIG. 11 is a block diagram of an example ring network node incorporating an embodiment of the invention.

FIG. 11 is a block diagram of an example ring network node incorporating an embodiment of the invention. The example ring network node 270 includes ring interfaces 272, 276, a ring traffic processor 274, a synchronization information receiver 278, a quality monitor 280, a local timing source 281, and a synchronization information distributor 282, interconnected as shown. As noted above for the example gateway node 260 (FIG. 10), other embodiments of a ring network node may include further, fewer, or different components interconnected in a similar or different manner than shown. For example, some embodiments of the invention may be applied to other types of networks and nodes than ring networks and ring nodes.

The example ring network node 270 may operate substantially as described above for the purposes of communicating in a ring communication network. Embodiments of the present invention add new synchronization features for local communication equipment, such as a femtocell site that is operatively coupled to a ring network node. With reference to FIG. 2, for example, a femtocell site might be connected to a ring node through a femtocell interface 73.

As shown, the synchronization information receiver 278 may be operatively coupled to the ring traffic processor 274. In some embodiments, the synchronization information receiver 278 may also or instead be operatively coupled directly to the westbound and eastbound ring interfaces 272, 276. The interconnections between these components will be at least in part implementation-dependent. For example, if dedicated synchronization connections are provided between ring nodes, then synchronization information need not necessarily be processed by the ring traffic processor 274, in which case the synchronization information receiver 278 could receive synchronization information directly through the ring interfaces 272, 276. However, many implementations will transfer synchronization information such as synchronization packets over the same connections or links as communication traffic, with all communications being processed by the ring traffic processor 274.

The quality monitor 280 could similarly communicate with remote ring nodes and/or components through the traffic processor 274, as shown, or directly through the ring interfaces 272, 276. The more direct communication option has not been shown in FIG. 11 for the quality monitor 280 in order to avoid overly complicating the drawing.

In the example ring network node 270, the synchronization components 278, 280, 281, 282 may be implemented in hardware, one or more components which execute software, firmware, or combinations thereof. Thus, the functional description below will enable a person skilled in the art to implement embodiments of the invention in any of various ways.

The synchronization information receiver 278 receives network synchronization information being transferred in a ring communication network. The received network synchronization information is for synchronizing communication equipment with a communication network to which the ring communication network is operatively coupled. The communication equipment may include installations of wireless communication equipment that are operatively coupled to the ring communication network and provide a wireless communication service to wireless communication devices in respective service areas. The wireless communication equipment installations may be associated with the same providers or carriers or with different providers or carriers.

The synchronization information distributor 282 provides, based on the received network synchronization information, local synchronization information for synchronizing a locally connected communication equipment installation, and also provides the received synchronization information for transmission in the ring communication network for synchronizing the other installations of communication equipment.

The synchronization information is thereby both "dropped" to synchronize local communication equipment and also passed along the ring communication equipment to synchronize other communication equipment that is connected to the ring. Installations of wireless communication equipment at all nodes in a ring, or even at nodes in multiple rings, for example, can thus be synchronized with each other.

Many of the features and functions described above for the example gateway node 260 (FIG. 10) may also apply to the example ring network node 270. For example, the local synchronization information that is provided to synchronize the local communication equipment may include at least a portion of the received network synchronization information. A ring network node such as 270 may also support the packet approach, in which the received network synchronization information includes a synchronization packet, and/or the frequency reference approach, in which the received network synchronization information includes a frequency reference signal. One likely scenario for femtocell deployment is that a femtocell will interface with a ring node via Ethernet. This implies that the ring node will generate a synchronization packet for an Ethernet interface or pass along a received synchronization packet to such an interface.

Quality monitoring may also be provided in some embodiments by the quality monitor 280, which monitors a quality measure of the received network synchronization information. A result of such monitoring may be reported by the quality monitor 280 to one or more other ring network nodes and/or to a gateway node that provides synchronization information to the ring network, through the ring traffic processor 274 or more directly, through the ring interfaces 272, 276.

Like the quality monitor 264 of the example gateway node 260, the quality monitor 280 may also or instead receive quality monitoring information associated with the network synchronization information being transferred in the ring network, from another ring network node, for example. Responsive to detection of a quality problem with the network synchronization information based on the received quality monitoring information, the quality monitor 280 might perform at least one of: causing a characteristic of the network synchronization information to be adjusted and reporting the quality problem.

Where the received network synchronization information includes multiple sets of redundant synchronization information, one of the multiple sets of redundant synchronization information could be selected for use as basis for the local synchronization information responsive to a result of the monitoring. Only the selected synchronization information, or possibly all of the received redundant synchronization information, may be passed along a ring by the ring network node 270. For example, the synchronization information distributor 282 might pass the selected synchronization information to the ring traffic processor 274 to be sent in both directions in the ring network. In other embodiments, the ring traffic processor 274, the synchronization information receiver 278, or the synchronization information distributor 282 might pass all received synchronization information, not only the selected synchronization information, along the ring network.

Redundancy in a ring network may be provided by transmitting the same synchronization information in both directions around the ring network. In this case, the synchronization information in each redundant set of synchronization information might be identical, and redundancy is provided by having two copies of the synchronization information circulating in opposite directions in the ring network.

The local timing source 281 may support a holdover function, in much the same manner as the local timing source 265 (FIG. 10).

Other features that may apply to gateway nodes, ring network nodes, or both, include error rate monitoring and QoS forwarding.

More general aspects of the present invention may similarly be implemented at gateway nodes, ring network nodes, or both. For example, another aspect of the invention relates to predictive traffic forwarding. An example apparatus that supports predictive traffic forwarding includes a communication interface, such as the westbound and eastbound ring interfaces 272, 276 (FIG. 11), to enable communications in a ring communication network. A traffic processor in a gateway node or a ring network node, which is operatively coupled to such an interface, processes communication traffic being transferred in the ring communication network.

It should be apparent from the foregoing description of femtocells that this communication traffic may include communication traffic destined for wireless communication devices to which a wireless communication service is provided within respective service areas by respective synchronized installations of wireless communication equipment that are operatively coupled to the ring communication network. The traffic processor 269, 274 is further operable to detect movement of a wireless communication device from a service area of one of the synchronized installations of wireless communication equipment to a service area of another one of the synchronized installations of wireless communication equipment, and to provide a predictive traffic forwarding function for communication traffic destined for the wireless communication device based on the detected movement.

In some implementations, the traffic might be forwarded to multiple local rings, to various nodes on those multiple rings, or to multiple rings that are operatively coupled together via a bonded link, as in FIG. 5 for instance. This could involve using a multicast feature over one or more bonded links. Predictive forwarding could thus be applied within a single ring or over multiple rings. A gateway node might forward traffic destined for a wireless communication device to a different local ring network or to a remote ring network where it is predicted that the wireless communication device will move into a service area covered by wireless communication equipment that is coupled to the different local ring network or the remote ring network, for instance.

The traffic processor 269, 274 could detect movement of the wireless communication device based on communication traffic that originates with the wireless communication device and is transferred in the ring communication network, for example. In one embodiment, movement is tracked by determining at which ring network node traffic from the wireless communication device entered the ring network.

A predictive traffic forwarding function might control one or more of: a network element of the ring to which the communication traffic destined for the wireless communication device is forwarded and a direction in which the communication traffic destined for the wireless communication device is forwarded in the ring communication network. For instance, the traffic processor 269, 274 might forward communication traffic to a particular ring network node and/or in a different direction in the ring network depending on the direction and speed of movement of the wireless communication device. If the wireless communication device has moved between service areas of femtocells of ring nodes in a clockwise direction, for instance, communication traffic destined for that device might be forwarded in the shortest direction toward a next node that the traffic processor 269, 274 predicts will be servicing the device if the device continues in motion.

Predictive traffic forwarding can reduce the amount of time it takes for traffic to be routed to a moving communication device. It may therefore be desirable to implement this function at one or more ring nodes in the ring network, and/or at a gateway that operatively couples the ring network to a bonded communication link.

Another broad aspect of the invention that could be provided at gateway nodes, ring nodes, or both, relates to dropping and passing an analog frequency reference signal. A synchronization information receiver 266, 278 might receive an analog frequency reference signal that is transferred in a first communication network, illustratively a ring network. The analog frequency reference signal is for synchronizing, with a second communication network, illustratively a main network, to which the first communication network is operatively coupled, installations of communication equipment, which might include wireless communication equipment in some embodiments, that are operatively coupled to the first communication network. A synchronization information distributor 268, 282 may then provide, based on the analog frequency reference signal, local synchronization information for synchronizing a locally connected one of the installations of communication equipment, and also pass the analog frequency reference signal for transmission in the first communication network for synchronizing other installations of communication equipment.

Other features and functions such as quality monitoring and related functions such as reporting, adjusting characteristics of the frequency reference signal, and redundancy might also be implemented in conjunction with this aspect of the invention.

More detailed examples of possible implementations of embodiments of the invention will now be considered.

Figure 12:
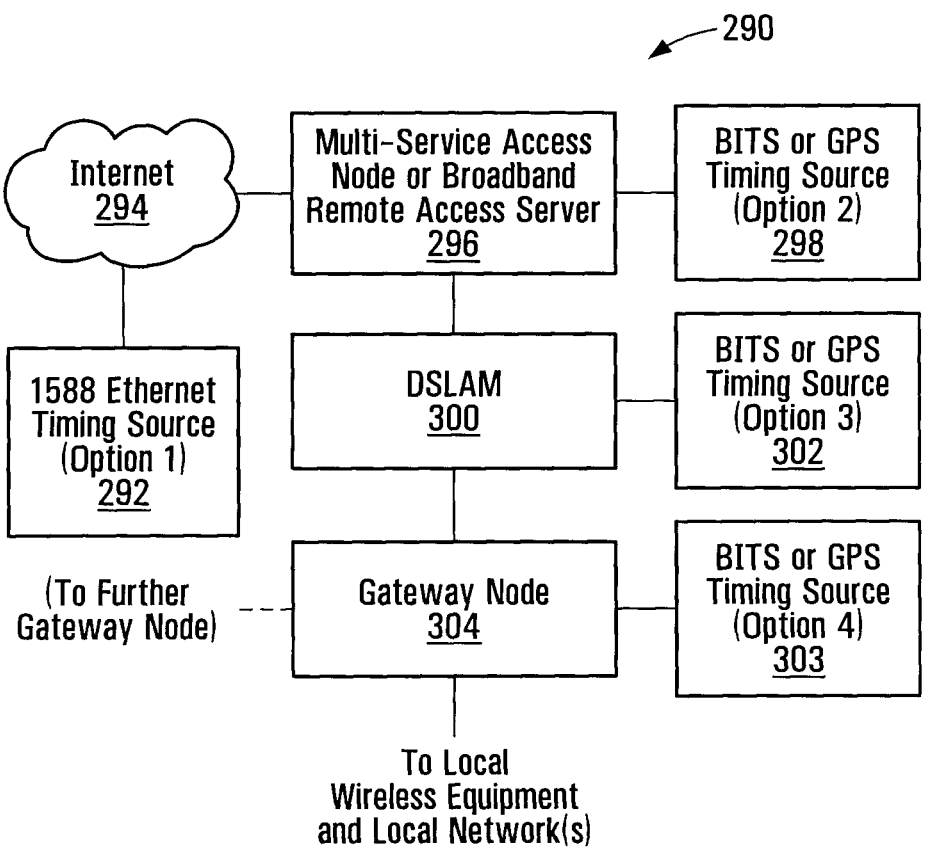
FIG. 12 is a block diagram of an example communication system having a gateway node incorporating an embodiment of the invention.

FIG. 12 is a block diagram of an example communication system 290 having a gateway node incorporating an embodiment of the invention. The example communication system 290 illustrates four options for a timing source, including an IEEE 1588 Ethernet timing source 292 which distributes timing through the Internet 294, a BITS or GPS timing source 298 which distributes timing through a Multi-Service Access Node (MSAN) or a Broadband Remote Access Server (BRAS) 296, a BITS or GPS timing source 302 which distributes timing through a DSLAM 300, and another BITS or GPS timing source 303 which distributes timing through the gateway node 304. The DSLAM 300 is coupled to the gateway node 304 through a bonded communication link, as described above.

Regardless of the end timing source used for remote synchronization to the gateway node 304, the packet approach or the frequency approach may be used to provide synchronization information to the gateway node. Dedicated DSL timing lines might be used from the DSLAM 300 to the gateway node 304 to ensure that a stable clock is provided to the gateway node, although it should be appreciated that dedicated lines are not mandatory. In the case of a bonded DSL link to the gateway node as described herein, the dedicated timing lines form part of a bonded link from which timing, or more generally synchronization information, is extracted or isolated.

The synchronized gateway node is the clock master for its subtending local communication network and may have any or all of the following functionality, as will be apparent from the foregoing description:

1) Two lines from the bonded group into the gateway node may be designated as timing lines, including one line as a primary line and a second line as a backup line should the primary line fail or suffer degradation. The packet approach might use dedicated (and/or possibly high priority) bandwidth paths for timing stream multicast.

2) The gateway node may monitor the incoming clock quality from two lines (or packet streams) and select the better of the two. If both timing sources are equal in quality, then the primary could be selected by default.

3) In the absence of synchronization, the gateway node may support holdover capability, as described above. It may retain for a period of time, illustratively 24 or 48 hours, information regarding the frequency and phase of the last source it was locked onto. The gateway node may slowly drift away from the last known frequency and phase after this lock-in period due to the limits in stability of current technology.

4) The gateway node may use a "synchronization messaging" capability to communicate information to an upstream component such as a DSLAM, and/or ring network nodes regarding synchronization quality. It may also or instead receive information about received clock quality and have the capability to send back details of actual clock quality received.

5) The gateway node may use multicast broadcasting and/or other techniques to distribute synchronization information to ensure that both phase and frequency are equal at all wireless communication equipment connected to the gateway node or to nodes in its subtending local network. This enables continuous coverage to be provided for a wireless communication device user in motion walking through a neighborhood, for example, as that user walks out of one service domain provided by wireless communication equipment at one node and into the next service domain of wireless communication equipment at another node.

Figure 13:
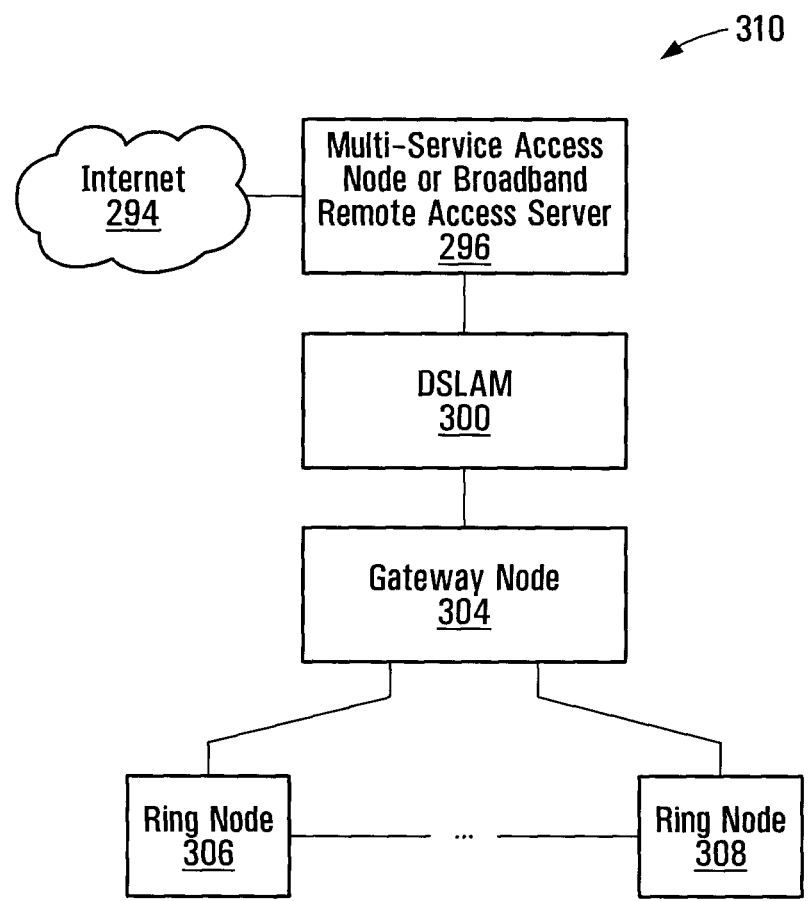
FIG. 13 is a block diagram of an example communication system having a gateway node and ring nodes incorporating embodiments of the invention.

FIG. 13 is a block diagram of an example communication system having a gateway node and ring nodes incorporating embodiments of the invention. The example system 310 of FIG. 13 is substantially similar to the example system 290 shown in FIG. 12, but does not explicitly show the timing sources 292, 298, 302.

A ring node 306, 308, and possibly all of the ring nodes in a ring communication network, may support any or all of the following functionality in accordance with embodiments of the invention:
1) Two dedicated pathways, including inner and outer ringlets, within a ring network may be used to ensure that a stable clock is provided to all subtending Femtocell sites or other wireless communication equipment, even in the event of neighboring nodal or link failure. Synchronization information transfer within a ring network may use the packet approach or frequency standard approach (using several DMT (Discrete MultiTone) bands).
2) A ring node may monitor the incoming clock quality from two lines (or packet streams) and select the better of the two. If both timing sources are equal in quality, then a primary source may be selected by default.
3) In the absence of synchronization, a ring node may have holdover capability, illustratively for 24 or 48 hours, and then drift away from the last known frequency and phase after this lock-in period due to limitations of current technology.
4) A ring node may use a "synchronization messaging" capability to communicate information to an upstream component such as a gateway node and/or other ring nodes about synchronization quality. It may also or instead receive information about received clock quality and have the capability to send back details of actual clock quality received.
5) A ring node may use the Efficient Multicast capability of RPR for both synchronization information and communication traffic to ensure that both phase and frequency are equal at all wireless communication equipment that is coupled to a ring network. This allows continuous service to be provided to a wireless communication device user in motion between service areas.

Regarding the actual transfer of synchronization information, one option is to use a packet exchange mechanism. This type of mechanism could be based on IEEE 1588, for example, to achieve synchronization at a gateway node via the Internet from an accurate timing source, such as the timing source 292 (FIG. 12). Additional measures can be implemented to ensure further robustness of the packet approach. For example, the Quality of Service field (ITU G.993) for incoming lines from a CO, represented in FIG. 12 as the DSLAM 300, containing synchronization packets can be set to the highest priority to thereby provide maximum assurance and minimum latency of synchronization packet delivery.

The same or a similar packet exchange mechanism could also be used to achieve synchronization between the gateway node 304 and ring network nodes 306, 308 (FIG. 13). Any or all of the following mechanisms can be used achieve further robustness in a ring network:
1) The Quality of Service field (ITU G.993) for lines between ring nodes containing synchronization messaging could be set to the highest priority, thereby guaranteeing synchronization packet delivery.
2) The Quality of Service field for outgoing pathways containing synchronization messaging could be carried on the A0 pathways (highest priority) of the RPR (IEEE 802.17) layer to guarantee synchronization packet delivery.
3) Two pathways (inner and outer ringlet) could be designated on a ring as timing lines, including a primary line and a second line as a backup line should the primary line fail or suffer degradation.

Other standards or communication protocols may provide QoS mechanisms, and/or possibly other mechanisms, that may be suitable for synchronization messaging. QoS fields are provided in both VDSL2 and RPR, and there are equivalents in Ethernet and in ITU G.8032 for Ethernet Rings, for example.

The frequency standard approach, in one embodiment, uses an incoming DSL line at a gateway node as a reference source whose traceability can be tracked to a stable synchronization source to achieve synchronization at the gateway node 304 from the DSLAM 300 (FIG. 12). This stable source could be injected at the DSLAM 300 directly via the BITS or GPS-based source 302. Alternatively, the DSLAM 300 can be timed from an upstream reference source 298 at the BRAS 296, which is synchronized to the reference frequency.

In one embodiment, the actual reference signal is chosen from a group of shared or dedicated DMT bands. This can be done in at least the two ways described below.

With dedicated DMT bands that are used only for synchronization, a PRBS pattern might be injected along with a frequency reference signal on several DMT bands at a transmitter end. This method may be advantageous in terms of synchronization information quality, but comes at the cost of bandwidth efficiency. At the receiving end, several DMT bands are monitored and the best timing signal, illustratively in an error-free DMT band, is chosen.

Figure 14:
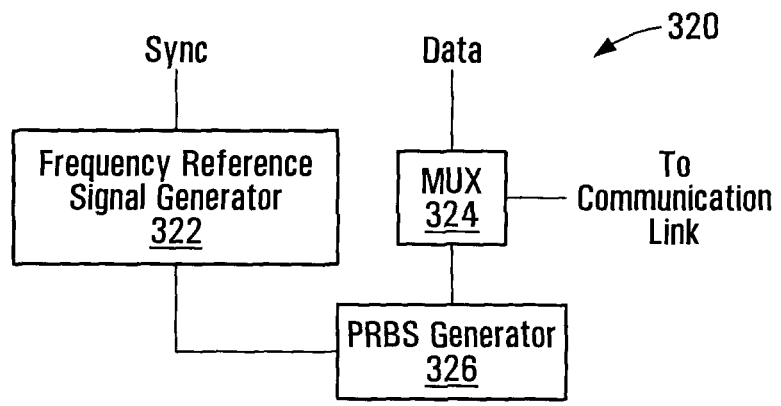
FIG. 14 is a block diagram of an example synchronization information generator.

FIG. 14 is a block diagram of an example synchronization information generator that implements the dedicated DMT band frequency approach. The frequency reference signal is generated by the frequency reference signal generator 322 and feeds a PRBS generator 326. The PRBS pattern generated by the PRBS generator 326 is multiplexed with data from a data path onto a communication link by the multiplexer 324, and enables bit errors to be detected at a receiving end. Those skilled in the art will be familiar with many types of signal generators and combiners that would be suitable for use as the generators 322, 326 and the multiplexer 324 shown in the example synchronization information generator 320. One example of a frequency reference signal generator 322 is an on-board VCXO that is fed from a BITS synchronization line or a recovered GPS signal, generally shown in FIG. 14 as a sync line.

A synchronization information generator 320 might be provided not only at an originating timing source, but at other locations as well. For example, a gateway node might receive a synchronization packet but use the frequency approach to distribute synchronization information in a subtending ring network. In this case, a synchronization information generator at the gateway node generates the frequency reference signal based on the received synchronization packet. It should thus be apparent that the frequency reference signal generator 322 need not necessarily include a timing source.

Figure 15:
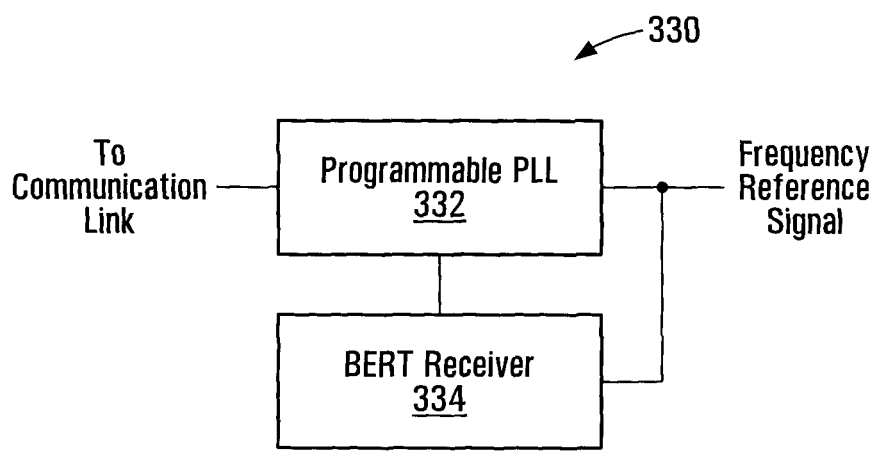
FIG. 15 is a block diagram of an example implementation of a synchronization information receiver and a quality monitor.

FIG. 15 is a block diagram of an example implementation 330 of a synchronization information receiver and a quality monitor that support the frequency approach. The programmable PLL (Phase Locked Loop) 332, which is an example of a synchronization signal receiver, effectively selects a frequency reference signal from a particular one of multiple DMT bands that are used for synchronization. The BERT (Bit Error Rate Tester) receiver 334 monitors bit error rate, and thus is one example of a quality monitor. Based on respective bit error rates in the DMT bands, the programmable PLL outputs a selected frequency reference signal.

With shared DMT bands, other network data are transmitted in the shared DMT bands and one of the shared DMT bands is selected at a receiver for use in synchronization, based on CRC (Cyclic Redundancy Check) error checking fields of Ethernet packets for instance. A DMT band with zero CRC errors or minimal CRC errors would be selected for synchronization.

For example, suppose that 5 DMT bands are used for synchronization. With CRC errors of 1, 0, 4, 0, 25 in the 5 DMT bands, either the second or fourth DMT band could be selected for synchronization.

The dedicated or shared frequency approach could be used for synchronization between a gateway node and a main network, for synchronization between a gateway node and ring network nodes, or both.

Various combinations of the foregoing features and functions in a communication system are possible. For example, a communication system might include a gateway node operatively coupled to a main communication network through a bonded communication link, at least one subscriber node, operatively coupled to the gateway node, to provide a communication service to subscriber premises, and at least one installation of wireless communication equipment, respectively operatively coupled to a subscriber node of the at least one subscriber node, to provide a wireless communication service within a respective service area. Such a system may include multiple gateway nodes and subtending local networks. Any or all of the gateway nodes and/or any or all of the at least one subscriber node may include features and functions according to embodiments of the invention.

Although described above primarily in terms of apparatus and systems, embodiments of the invention may also or instead be embodied in methods.

FIGS. 16 to 19 are flow diagrams illustrating example methods according to embodiments of the invention.

Figure 16:
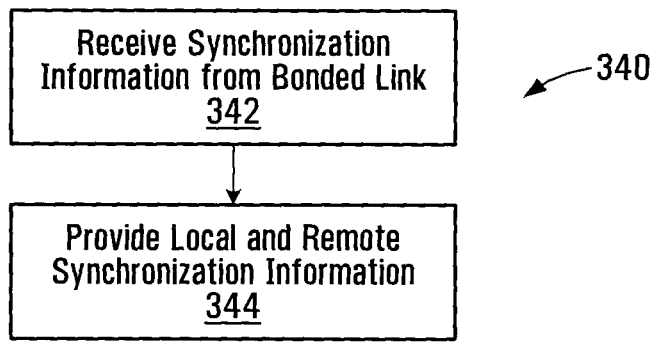
FIGS. 16 to 19 are flow diagrams illustrating example methods according to embodiments of the invention.

The method 340 in FIG. 16 involves receiving network synchronization information from a bonded communication link at 342. The bonded communication link enables communications with a communication network, and the received network synchronization information is for synchronizing communication equipment with the communication network. At 344, local and remote synchronization information are provided based on the received network synchronization information. The local synchronization information is for synchronizing the communication equipment with the communication network, and the remote synchronization information is for transmission to further communication equipment for synchronizing the further communication equipment with the communication network.

Figure 17:
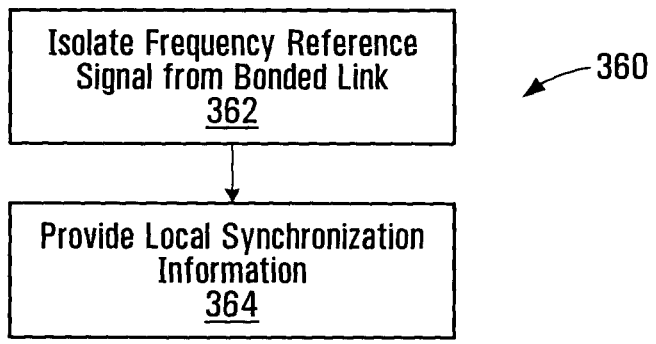

The method 360 shown in FIG. 17 includes, at 362, isolating a frequency reference signal from a DSL communication link which is a constituent link of a bonded communication link to a communication network. The received frequency reference signal includes network synchronization information for synchronizing communication equipment with the communication network. Based on the received frequency reference signal, local synchronization information for synchronizing the communication equipment with the communication network is provided at 364.

Figure 18:
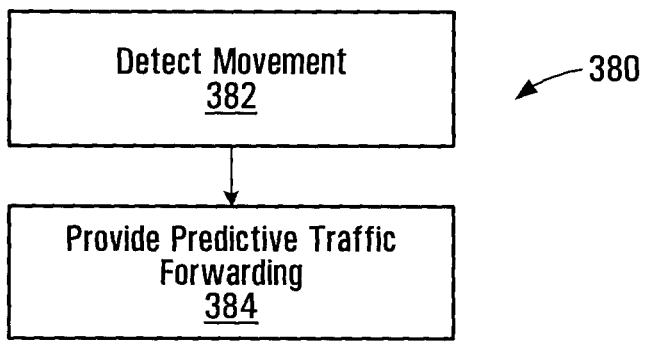

Another example method 380 is shown in FIG. 18, and involves an operation 382 of detecting movement of a wireless communication device, to which a wireless communication service is provided within respective service areas by respective synchronized installations of wireless communication equipment that are operatively coupled to a ring communication network, from a service area of one of the synchronized installations of wireless communication equipment to a service area of another one of the synchronized installations of wireless communication equipment. The method also includes providing a predictive traffic forwarding function for communication traffic destined for the wireless communication device based on the detected movement, at 384.

Figure 19:
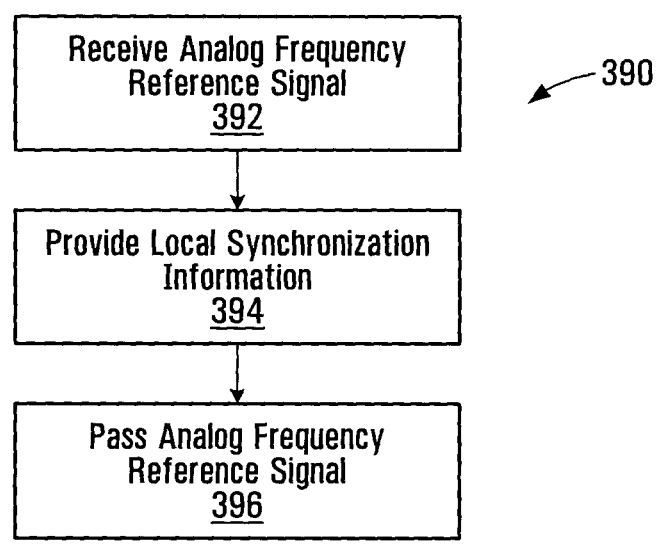

In the example method 390 of FIG. 19, an analog frequency reference signal being transferred in a first communication network is received at 392. The analog frequency reference signal includes network synchronization information for synchronizing, with a second communication network to which the first communication network is operatively coupled, installations of communication equipment that are operatively coupled to the first communication network. Based on the analog frequency reference signal, local synchronization information for synchronizing a locally connected one of the installations of communication equipment is provided at 394. At 396, the analog frequency reference signal is passed for transmission in the first communication network for synchronizing other ones of the installations of communication equipment.

Variations of the examples methods shown in FIGS. 16 to 19 are contemplated. For example, the features described in detail above in the context of apparatus embodiments of the invention may also be applied to method embodiments.

A method substantially similar to the method 360 in FIG. 17 could be implemented in an optical system, in which a frequency reference signal is received on a dedicated wavelength of an optical communication link to a communication network instead of on a bonded link. Local synchronization information for synchronizing communication equipment with the communication network can then be provided as shown at 364 based on the received frequency reference signal.

A variation of the method 390 shown in FIG. 19 could similarly be applied to the more general case of network synchronization information being transferred in a ring communication network. Based on received network synchronization information for synchronizing, with a communication network to which the ring communication network is operatively coupled, installations of communication equipment that are operatively coupled to the ring communication network, local synchronization information for synchronizing a locally connected one of the installations of communication equipment can be provided, as shown at 394. The received synchronization information can also be provided for transmission in the ring communication network for synchronizing other ones of the installations of communication equipment, to provide a passing function such as shown at 396 for a frequency reference signal.

Thus, more generally, other method embodiments may involve further, fewer, and/or different operations that are performed in a similar or different order than shown in FIGS. 16 to 19.

What has been described is merely illustrative of the application of principles of embodiments of the invention. Other arrangements and methods can be implemented by those skilled in the art without departing from the scope of the present invention.

For example, the invention is no way limited to the specific divisions of function in the drawings and described above.

It should also be appreciated that at least some embodiments of the invention could be applied in conjunction with an optical backhaul communication link, such as a link in an optical collector ring, illustratively an RPR optical collector ring. In an apparatus implementation, a gateway node might include an optical interface instead of or in addition to the bonding interface(s) 262 (FIG. 10). A synchronization information receiver could then receive a frequency reference signal on a dedicated wavelength of an optical communication link to a communication network, and a synchronization information distributor could provide, based on the received frequency reference signal, local synchronization information for synchronizing the communication equipment with the communication network. Other apparatus and/or method features described in detail above might similarly apply to a system with optical backhaul.

Another possible variation is the implementation of embodiments of the invention in conjunction with one or more asymmetric ring networks, in which traffic channels and/or bandwidths are asymmetric. This asymmetry may be directional, where different directions on a ring support different channel numbers and/or bandwidths; per-link, where each link in a ring may have different numbers of channels and/or bandwidth capacities; or some combination of directional and per-link asymmetry.

Embodiments of the invention are not mutually exclusive to implementation in a gateway node or a ring node. For example, network synchronization information for synchronizing communication equipment with a main network might be received directly from a network communication link by a gateway node. At a ring network node, the network synchronization information may be received indirectly, through a gateway node and possibly one or more other ring nodes.

In addition, although described primarily in the context of methods and systems, other implementations of the invention are also contemplated, as instructions stored on a computer-readable medium, for example.

We claim:

1. An apparatus comprising:
a synchronization information receiver to receive network synchronization information from a network communication link that enables communications with a communication network, the received network synchronization information for synchronizing communication equipment with the communication network;
a quality monitor to monitor a quality measure of the received network synchronization information; and
a synchronization information distributor to provide, based on the received network synchronization information, local synchronization information for synchronizing local communication equipment with the communication network, and to provide, based on the received network synchronization information, remote synchronization information for transmission to remote communication equipment via a Quality of Service (QoS) forwarding mechanism over a Digital Subscriber Line (DSL) communication link, the remote synchronization information for synchronizing the remote communication equipment with the communication network,
the local communication equipment and the remote communication equipment comprising respective installations of wireless communication equipment that are coupled to a further communication network comprising the DSL communication link and provide a wireless communication service to wireless communication devices within respective service areas,
the network communication link comprising a bonded communication link,
the synchronization information receiver being operable to isolate respective redundant frequency reference signals from multiple DSL communication links of the bonded communication link, the redundant frequency reference signals comprising the network synchronization information, one of the redundant frequency reference signals being selected for use as basis for the local synchronization information responsive to a result of monitoring by the quality monitor,
the quality measure comprising respective error rates of the redundant frequency reference signals, the redundant frequency reference signal having a lowest error rate being selected for use as basis for the local synchronization information,
the synchronization information distributor being operable to determine the respective error rates based on a PRBS (Pseudo-Random Bit Sequence) that is combined with the redundant frequency reference signals.

2. The apparatus of claim 1, the installations of wireless communication equipment being associated with one or more wireless service providers.

3. The apparatus of claim 1,
wherein the synchronization information distributor is operable to provide the selected frequency reference signal as the local synchronization information, and
wherein the synchronization information distributor comprises a synchronization information generator to generate as the remote synchronization information a synchronization packet based on the selected frequency reference signal.

4. The apparatus of claim 1, wherein the quality monitor is further operable to report a monitoring result via the network communication link.

5. The apparatus of claim 1,
the quality monitor being further operable to perform at least one of: receiving quality monitoring information associated with the remote synchronization information and reporting a monitoring result to the remote communication equipment.

6. The apparatus of claim 5, wherein the quality monitor is further operable to detect a quality problem with the remote synchronization information based on the received quality monitoring information, and to perform, responsive to detecting the quality problem, at least one of: causing a characteristic of the remote synchronization information to be adjusted and reporting the quality problem via the network communication link.

7. The apparatus of claim 1, wherein the further communication network comprises a ring communication network.

8. The apparatus of claim 1, wherein the synchronization information distributor is further operable to transmit the remote synchronization information using one or more of: RPR (Resilient Packet Ring), Ethernet, and VDSL2 (Very high bit rate Digital Subscriber Line version 2).

9. The apparatus of claim 1, wherein the synchronization information distributor is operable to provide the local synchronization information and the remote synchronization information based on the received network synchronization information where no new network synchronization information is received during a holdover time period.

10. The apparatus of claim 1,
the quality monitor being further operable to use the selected frequency reference signal as a messaging channel to report a monitoring result.

11. The apparatus of claim 1, wherein the redundant frequency reference signals comprise DSL traffic being transferred on the multiple DSL communication links, and wherein the local synchronization information comprises a clock signal recovered from the DSL traffic being transferred on one of the multiple DSL communication links.

12. The apparatus of claim 1,
wherein the further communication network comprises a ring communication network that is operatively coupled to the communication network through the network communication link,
wherein the network synchronization information comprises network synchronization information being transferred in the ring communication network, the received network synchronization information for synchronizing, with the communication network, installations of communication equipment that are operatively coupled to the ring communication network,
wherein the local communication equipment and the remote communication equipment comprise two of the installations of communication equipment operatively coupled to the ring communication network, and
wherein the synchronization information distributor is further operable to provide the remote synchronization information for transmission in the ring communication network for synchronizing others of the installations of communication equipment.

13. The apparatus of claim 12,
wherein the redundant frequency reference signals comprise frequency reference signals being transferred in opposite directions in the ring communication network.

14. The apparatus of claim 1, wherein the synchronization information distributor is further operable to pass the selected frequency reference signal for transmission to the remote communication equipment for synchronizing the remote communication equipment with the communication network.

15. The apparatus of claim 1, wherein the further communication network comprises a ring communication network in which at least one of traffic channels and bandwidths are asymmetric.

16. The apparatus of claim 1, wherein the DSL communication link comprises a bonded communication link.

17. A communication system comprising:
a gateway node operatively coupled to a main communication network through a bonded or optical communication link;
at least one subscriber node, operatively coupled to the gateway node, to provide a communication service to subscriber premises; and
at least one installation of communication equipment, respectively operatively coupled to a subscriber node of the at least one subscriber node,
wherein any or all of the gateway node and at least one subscriber node comprises the apparatus of claim 1.

18. The communication system of claim 17, further comprising:
at least one further gateway node operatively coupled to the gateway node through a respective bonded communication link;
a respective set of at least one further subscriber node, respectively operatively coupled to the at least one gateway node, to provide a communication service to further subscriber premises; and
at least one further installation of communication equipment, respectively operatively coupled to a subscriber node of the at least one further subscriber node,
wherein any or all of the at least one further gateway node and the at least one further subscriber node comprises the apparatus of claim 1.

19. A method comprising:
receiving network synchronization information from a network communication link that enables communications with a communication network, the received network synchronization information for synchronizing communication equipment with the communication network, the network communication link comprising a bonded communication link, the receiving comprising isolating respective redundant frequency reference signals from multiple DSL (Digital Subscriber Line) communication links of the bonded communication link, the redundant frequency reference signals comprising the network synchronization information;
providing, based on the received network synchronization information, local synchronization information for synchronizing local communication equipment with the communication network;
providing, based on the received network synchronization information, remote synchronization information for transmission to remote communication equipment via a Quality of Service (QoS) forwarding mechanism over a Digital Subscriber Line (DSL) communication link, the remote synchronization information for synchronizing the remote communication equipment with the communication network,
the local communication equipment and the remote communication equipment comprising respective installations of wireless communication equipment that are coupled to a further communication network comprising the DSL communication link and provide a wireless communication service to wireless communication devices within respective service areas,
the method further comprising:
monitoring a quality measure of the respective frequency reference signals;
selecting one of the redundant frequency reference signals for use as basis for the local synchronization information responsive to a result of the monitoring, the quality measure comprising respective error rates of the redundant frequency reference signals, wherein selecting comprises selecting the redundant frequency reference signal having a lowest error rate;
determining the respective error rates based on a PRBS (Pseudo-Random Bit Sequence) that is combined with the redundant frequency reference signals.

20. The method of claim 19, wherein providing the local synchronization comprises providing the selected frequency reference signal as the local synchronization information, and wherein providing the remote synchronization information comprises generating as the remote synchronization information a synchronization packet based on the selected frequency reference signal.

21. The method of claim 19, further comprising:
reporting a monitoring result via the network communication link.

22. The method of claim 19, further comprising:
at least one of: receiving quality monitoring information associated with the remote synchronization information and reporting a monitoring result to the remote communication equipment.

23. The method of claim 22, further comprising:
detecting a quality problem with the remote synchronization information based on the received quality monitoring information; and
performing, responsive to detecting the quality problem, at least one of: causing a characteristic of the remote synchronization information to be adjusted and reporting the quality problem via the network communication link.

24. The method of claim 19, wherein the further communication network comprises a ring communication network.

25. The method of claim 19, further comprising:
transmitting the remote synchronization information using one or more of: RPR (Resilient Packet Ring), Ethernet, and VDSL2 (Very high bit rate Digital Subscriber Line version 2).

26. The method of claim 19, wherein providing the local synchronization information and providing the remote synchronization information comprise providing the local synchronization information and providing the remote synchronization information based on the received network synchronization information where no new network synchronization information is received during a holdover time period.

27. The method of claim 19, further comprising:
using the selected frequency reference signal as a messaging channel to report a monitoring result.

28. The method of claim 19, wherein the redundant frequency reference signals comprise DSL traffic being transferred on the multiple DSL communication links, and wherein the local synchronization information comprises a clock signal recovered from the DSL traffic being transferred on one of the multiple DSL communication links.

29. The method of claim 19,
wherein the further communication network comprises a ring communication network that is operatively coupled to the communication network through the network communication link,
wherein the network synchronization information comprises network synchronization information being transferred in the ring communication network, the received network synchronization information for synchronizing, with the communication network, installations of communication equipment that are operatively coupled to the ring communication network,
wherein the local communication equipment and the remote communication equipment comprise two of the installations of communication equipment operatively coupled to the ring communication network, and
wherein the method further comprises providing the received synchronization information for transmission in the ring communication network for synchronizing others of the installations of communication equipment.

30. The method of claim 29,
wherein the redundant frequency reference signals comprise frequency reference signals being transferred in opposite directions in the ring communication network.

31. The method of claim 19, the method further comprising:
passing the selected frequency reference signal for transmission to the remote communication equipment for synchronizing the remote communication equipment with the communication network.

32. The method of claim 19, wherein the DSL communication link comprises a bonded communication link.

* * * * *